US008286927B2

(12) United States Patent
Sweere et al.

(10) Patent No.: US 8,286,927 B2
(45) Date of Patent: Oct. 16, 2012

(54) LIFT MECHANISM SYSTEMS AND METHODS

(75) Inventors: Harry C. Sweere, Minneapolis, MN (US); Janice M. Sweere, legal representative, Minneapolis, MN (US); Mustafa A. Ergun, Shoreview, MN (US); Robert W. Fluhrer, Prior Lake, MN (US); Shaun C. Lindblad, Lino Lakes, MN (US); Jeffrey M. Eliason, Shoreview, MN (US); Steve Nistler, Rosemount, MN (US); Ron Saltz, Roberts, WI (US); Joe Funk, St. Paul, MN (US)

(73) Assignee: Ergotron, Inc., St. Paul, MN (US)

( * ) Notice: Subject to any disclaimer, the term of this patent is extended or adjusted under 35 U.S.C. 154(b) by 50 days.

(21) Appl. No.: 12/755,813

(22) Filed: Apr. 7, 2010

(65) Prior Publication Data

US 2010/0193653 A1    Aug. 5, 2010

Related U.S. Application Data

(63) Continuation of application No. 12/729,811, filed on Mar. 23, 2010, now abandoned, which is a continuation of application No. 11/238,167, filed on Sep. 28, 2005, now abandoned, and a continuation-in-part of application No. 10/903,316, filed on Jul. 30, 2004, now abandoned, and a continuation-in-part of application No. 10/792,467, filed on Mar. 3, 2004, now abandoned.

(60) Provisional application No. 60/613,993, filed on Sep. 28, 2004, provisional application No. 60/633,999, filed on Dec. 7, 2004, provisional application No. 60/586,375, filed on Jul. 8, 2004, provisional application No. 60/585,781, filed on Jul. 6, 2004, provisional application No. 60/492,015, filed on Aug. 1, 2003, provisional application No. 60/471,869, filed on May 20, 2003.

(51) Int. Cl.
    *A47F 1/10* (2006.01)
(52) U.S. Cl. ............... 248/297.21; 248/422; 248/162.1; 248/920; 248/332; 108/147
(58) Field of Classification Search ............ 248/297.21, 248/162.1, 917, 920, 157, 572, 123.11, 332; 108/147; 74/517
See application file for complete search history.

(56) References Cited

U.S. PATENT DOCUMENTS

| | | | |
|---|---|---|---|
| 660,868 A | * | 10/1900 | Reid ............................. 108/147 |
| 2,010,214 A | | 8/1935 | Braun |
| 2,168,209 A | | 8/1939 | Haupt |
| 2,178,122 A | * | 10/1939 | Ostler et al. .................... 74/592 |

(Continued)

*Primary Examiner* — Terrell McKinnon
*Assistant Examiner* — Daniel J Breslin
(74) *Attorney, Agent, or Firm* — Fredrikson & Byron, P.A.

(57) ABSTRACT

The invention includes a display positioning assembly comprising a support, a display supported by the support, and a balance mechanism carried by the display and operatively connected to the support. The invention also includes an article for selectively exposing a display comprising a generally planar support surface having a first side and a second side opposite the first side. A balance mechanism operatively connected to a display may be positionable between a storage position proximate the first side of the generally planar support surface and an exposed position proximate the second side of the generally planar support surface. The invention also includes an assembly for arresting the free fall of an object. The assembly may comprise an outer slide in sliding or rolling engagement with an inner slide, and a brake comprising at least one pivot member may be coupled to the inner slide.

9 Claims, 35 Drawing Sheets

U.S. PATENT DOCUMENTS

| | | | |
|---|---|---|---|
| 2,471,998 A * | 5/1949 | Berggren | 248/572 |
| 2,480,865 A * | 9/1949 | Lofstrand | 74/517 |
| 2,506,228 A | 5/1950 | Lofstrand, Sr. | |
| 2,657,925 A | 11/1953 | Crow | |
| 2,924,411 A * | 2/1960 | Rouverol | 248/572 |
| 3,269,035 A | 8/1966 | Bong | |
| 3,543,282 A | 11/1970 | Sautereau | |
| 3,575,368 A * | 4/1971 | Thomas et al. | 248/572 |
| 3,675,597 A | 7/1972 | Oddsen et al. | |
| 3,767,181 A | 10/1973 | Van der Burgt et al. | |
| 3,890,907 A | 6/1975 | Peterson | |
| RE28,767 E | 4/1976 | Kuhlmann et al. | |
| 4,215,776 A | 8/1980 | Esler | |
| 4,351,245 A * | 9/1982 | Laporte | 108/136 |
| 4,357,249 A | 11/1982 | Mellor | |
| 4,387,468 A | 6/1983 | Fenne et al. | |
| 4,387,876 A | 6/1983 | Nathan | |
| 4,389,228 A | 6/1983 | Leunig | |
| 4,427,243 A | 1/1984 | Miller | |
| 4,494,720 A | 1/1985 | Gregory et al. | |
| 4,605,189 A | 8/1986 | Bruneau | |
| 4,685,648 A * | 8/1987 | Dobner et al. | 248/572 |
| 4,691,886 A | 9/1987 | Wendling et al. | |
| 4,697,977 A | 10/1987 | Loomer et al. | |
| 4,706,920 A | 11/1987 | Ojima et al. | |
| 4,751,884 A | 6/1988 | Ball | |
| 4,760,622 A | 8/1988 | Rohrman | |
| 4,768,762 A | 9/1988 | Lund | |
| 4,836,478 A | 6/1989 | Sweere | |
| 4,856,740 A | 8/1989 | MacLeod et al. | |
| 4,914,780 A | 4/1990 | Rogers et al. | |
| 4,920,381 A | 4/1990 | Mahoney | |
| 4,953,256 A | 9/1990 | Salmela et al. | |
| 4,953,748 A | 9/1990 | Wheelock | |
| 4,964,152 A | 10/1990 | Kaul et al. | |
| 4,964,221 A | 10/1990 | Breyer et al. | |
| 5,101,735 A * | 4/1992 | Williams | 104/117 |
| 5,141,481 A * | 8/1992 | Kolbel | 482/126 |
| 5,143,333 A | 9/1992 | Warden | |
| 5,160,104 A | 11/1992 | Sher | |
| 5,246,191 A | 9/1993 | Moss | |
| 5,305,996 A | 4/1994 | Taniwa et al. | |
| 5,311,827 A * | 5/1994 | Greene | 108/147 |
| 5,400,721 A * | 3/1995 | Greene | 108/147 |
| 5,464,197 A * | 11/1995 | Ecclesfield | 267/155 |
| 5,487,525 A | 1/1996 | Drabczyk et al. | |
| 5,520,361 A | 5/1996 | Lee | |
| 5,589,849 A | 12/1996 | Ditzik | |
| 5,626,323 A | 5/1997 | Lechman et al. | |
| 5,668,570 A | 9/1997 | Ditzik | |
| 5,718,406 A | 2/1998 | Long | |
| 5,722,513 A | 3/1998 | Rowan et al. | |
| 5,738,316 A | 4/1998 | Sweere et al. | |
| 5,743,503 A | 4/1998 | Voeller et al. | |
| 5,836,562 A | 11/1998 | Danzyger et al. | |
| 5,842,672 A | 12/1998 | Sweere et al. | |
| 5,860,370 A | 1/1999 | Poniecki | |
| 5,876,008 A | 3/1999 | Sweere et al. | |
| 5,881,984 A | 3/1999 | Lin | |
| 5,902,201 A | 5/1999 | Vermeer et al. | |
| 5,918,841 A | 7/1999 | Sweere et al. | |
| 5,924,665 A | 7/1999 | Sweere et al. | |
| 5,931,549 A | 8/1999 | Lindberg | |
| 5,947,429 A | 9/1999 | Sweere et al. | |
| 5,967,479 A | 10/1999 | Sweere et al. | |
| 5,992,809 A | 11/1999 | Sweere et al. | |
| 6,012,693 A | 1/2000 | Voeller et al. | |
| 6,019,332 A | 2/2000 | Sweere et al. | |
| 6,026,755 A | 2/2000 | Long | |
| 6,064,373 A | 5/2000 | Ditzik | |
| 6,189,849 B1 | 2/2001 | Sweere et al. | |
| 6,227,518 B1 | 5/2001 | Sun | |
| 6,229,584 B1 | 5/2001 | Chuo et al. | |
| 6,326,955 B1 | 12/2001 | Ditzik | |
| 6,378,829 B1 | 4/2002 | Strater et al. | |
| 6,434,851 B1 * | 8/2002 | Nishina | 33/559 |
| 6,474,637 B1 * | 11/2002 | Spall et al. | 271/160 |
| 6,994,306 B1 | 2/2006 | Sweere et al. | |
| 6,997,422 B2 | 2/2006 | Sweere et al. | |
| 7,032,870 B2 | 4/2006 | Sweere et al. | |
| 7,063,024 B2 | 6/2006 | Latino | |
| 7,104,203 B2 | 9/2006 | Lo | |
| 7,658,359 B2 * | 2/2010 | Jones et al. | 248/406.1 |
| 7,677,523 B2 * | 3/2010 | Stokkermans | 248/572 |
| 7,854,417 B2 * | 12/2010 | Gan et al. | 248/161 |
| 2002/0088910 A1 | 7/2002 | Sweere et al. | |
| 2002/0100851 A1 | 8/2002 | Abramowsky et al. | |
| 2004/0035243 A1 | 2/2004 | Duval | |
| 2004/0035989 A1 | 2/2004 | Sweere et al. | |
| 2005/0035252 A1 | 2/2005 | Chen | |
| 2005/0139734 A1 | 6/2005 | Sweere et al. | |
| 2005/0145762 A1 | 7/2005 | Sweere et al. | |
| 2005/0205731 A1 * | 9/2005 | Shimizu et al. | 248/176.3 |
| 2006/0145036 A1 | 7/2006 | Jones et al. | |
| 2008/0099637 A1 * | 5/2008 | Pai | 248/157 |
| 2009/0189048 A1 * | 7/2009 | Gan et al. | 248/422 |

* cited by examiner

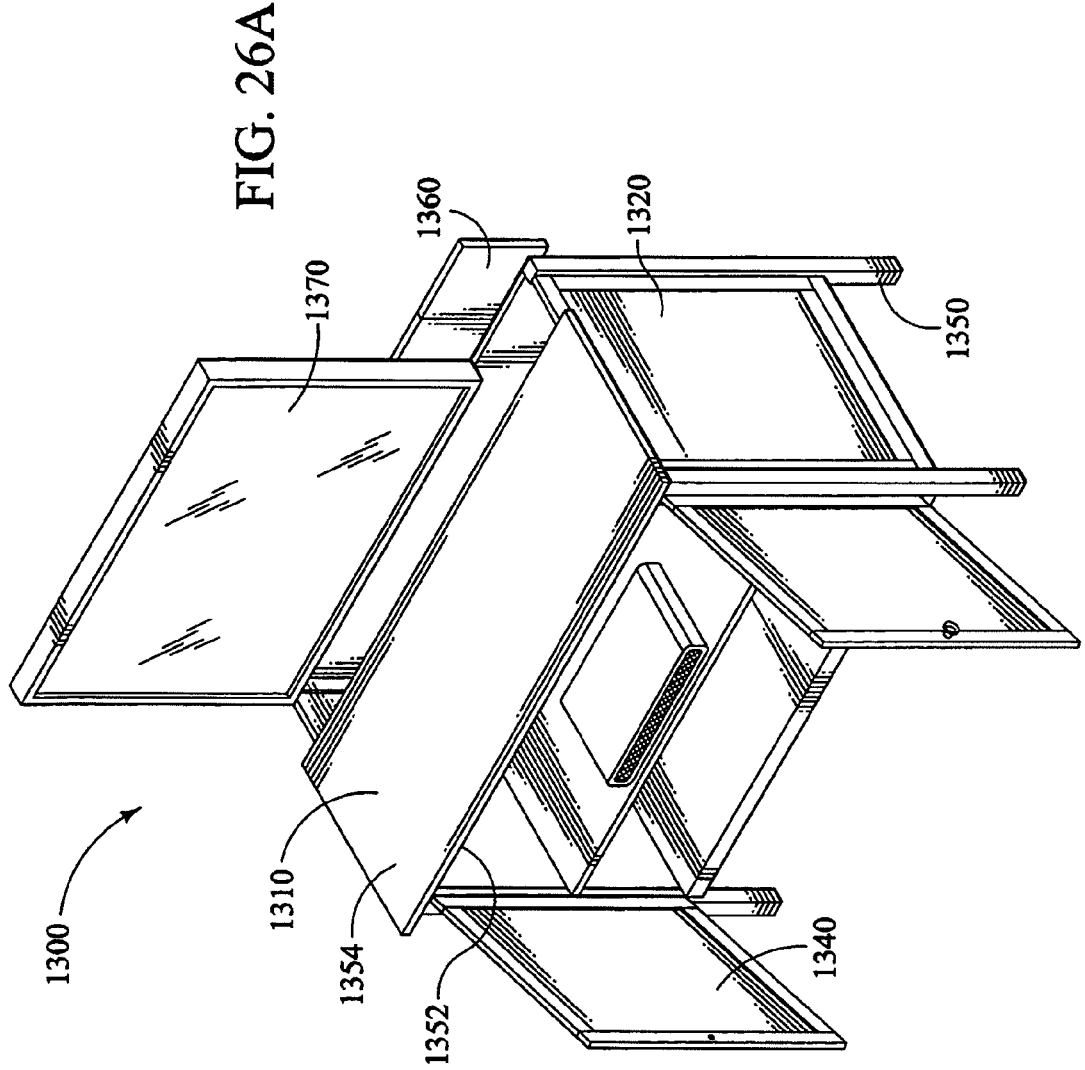

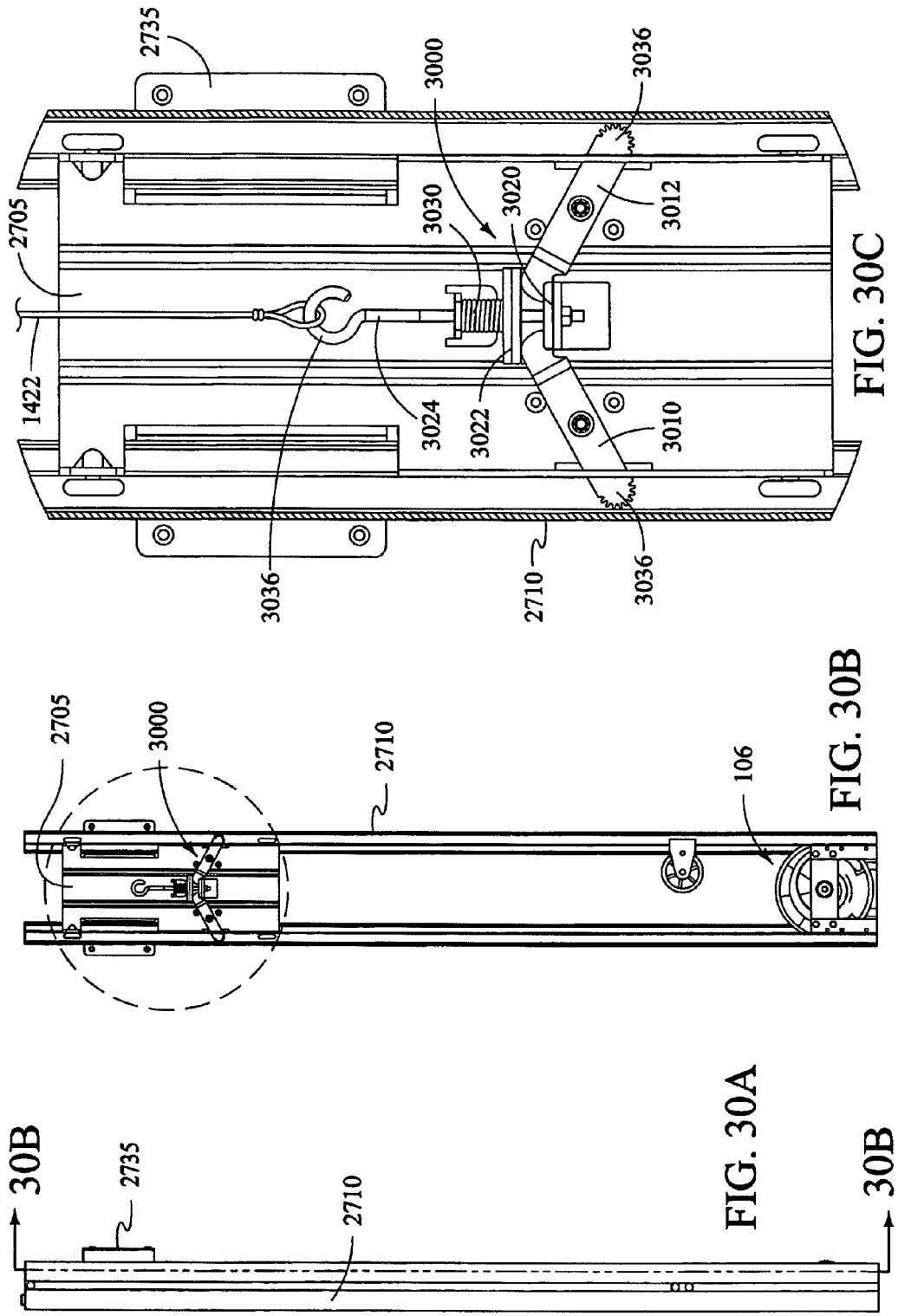

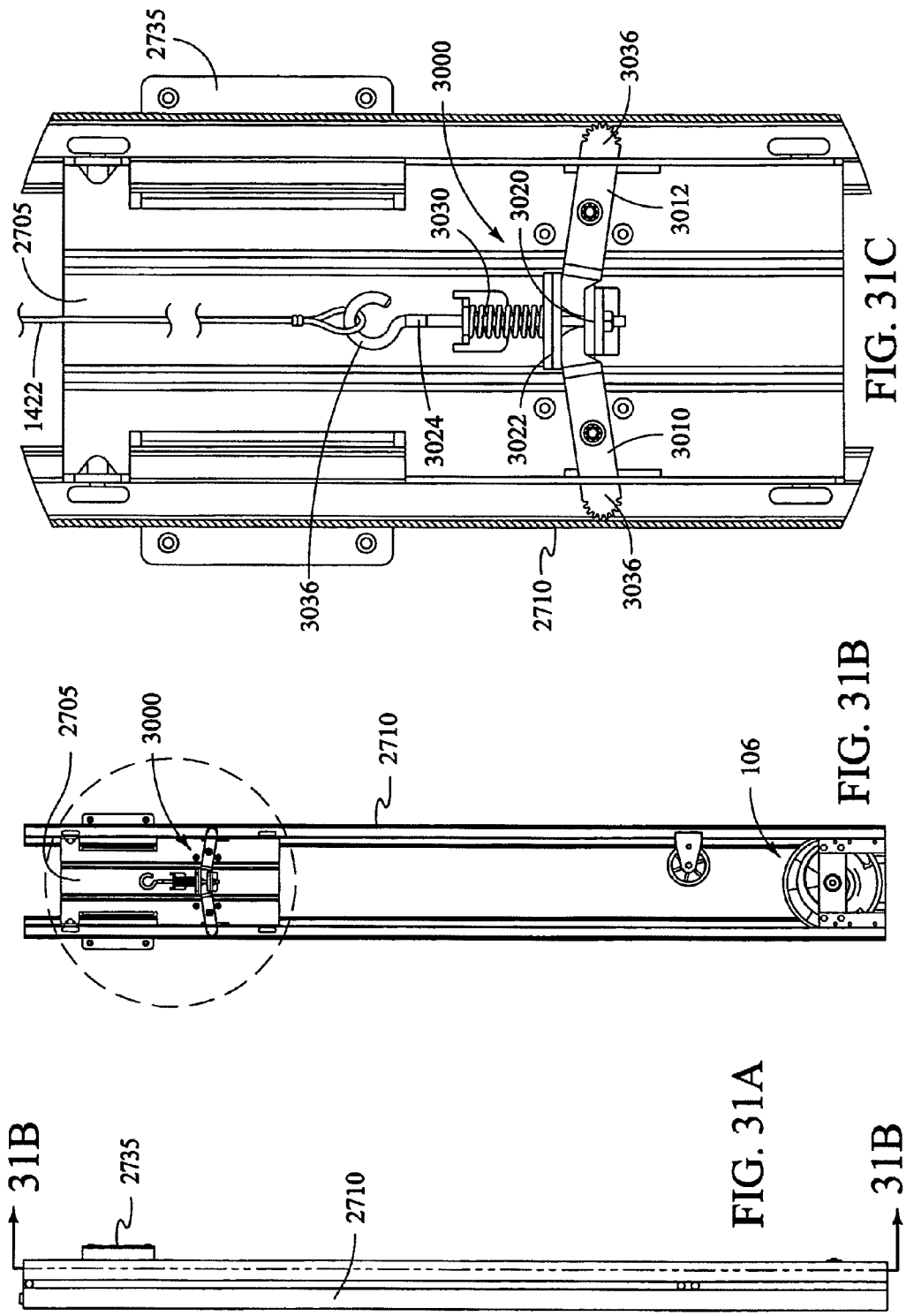

LIFT MECHANISM SYSTEMS AND METHODS

RELATED APPLICATIONS

This application is a continuation of U.S. patent application Ser. No. 12/729,811, titled LIFT MECHANISM SYSTEMS AND METHODS, filed Mar. 23, 2010 now abandoned, which is a continuation of U.S. patent application Ser. No. 11/238,167, titled LIFT MECHANISM SYSTEMS AND METHODS, filed Sep. 28, 2005 now abandoned, which claims the benefit of U.S. Patent Application Ser. Nos. 60/613,993, filed Sep. 28, 2004, and 60/633,999, filed Dec. 7, 2004, and which is a continuation-in-part of U.S. application Ser. No. 10/903,316, filed on Jul. 30, 2004 now abandoned, which in turn claims the benefit of U.S. Application Ser. Nos. 60/586,375, filed Jul. 8, 2004, 60/585,781, filed Jul. 6, 2004, and 60/492,015, filed Aug. 1, 2003, and which is a continuation in part of U.S. application Ser. No. 10/792,467, filed Mar. 3, 2004 now abandoned, which in turn claims the benefit of U.S. Application Ser. Nos. 60/492,015, filed Aug. 1, 2003, and 60/471,869, filed May 20, 2003.

The entire disclosure of each of the above-mentioned patent applications is hereby incorporated by reference herein.

FIELD OF THE INVENTION

The present invention relates generally to an apparatus for supporting a load or for supplying a pre-determined force either constant or variable in either a vertical or horizontal or other orientation.

BACKGROUND OF THE INVENTION

In recent years, ergonomic concerns have taken on increased importance due to several factors. For example, workers are often able to be more productive when working in an ergonomically friendly environment. Moreover, when workers are forced to work in ergonomically unsuitable environments, they may be injured and/or may perform at a substandard level.

Many jobs involve working with personal computers and/or display monitors. In such jobs, the personal computers and/or display monitors may be used by multiple operators at different times during a day. In some settings, one computer and/or monitor may be used by multiple people of different sizes and having different preferences in a single day. Given the differences in people's size and differences in their preferences, a monitor or display adjusted at one setting for one individual may be inappropriate for another individual. For instance, a child would have different physical space needs than an adult using the same computer and monitor.

In many contexts, operators are using computers for longer periods of time, which increases the importance of comfort to the operator. An operator may choose to use the monitor as left by the previous user despite the discomfort, annoyance, and inconvenience resulting from using settings optimized for another individual. This type of situation may result in substandard job performance and even injury after prolonged use.

In some situations, people must perform operations in various postures. For example, one may be required to perform some operations in a seated position and others in a standing position. In such situations, both the seated operations and the standing operations may require the same workstation. Such workstations may include a computer monitor, a keyboard, and/or a mouse.

Moreover, as monitors grow in size and weight, ease of adjustability is an important consideration. For monitors requiring frequent adjustment, adjustability for monitors has been provided using an arm coupled with gas springs, where the arm is hingedly coupled with the desk or a vertical surface. However, the gas springs are costly and the gas may leak out over time. In addition, the gas springs require a significant amount of space, for instance arm length, which can be at a premium in certain applications, such as in hospitals.

SUMMARY OF THE INVENTION

Embodiments of the invention may be implemented in various contexts to raise and lower a multitude of objects. Examples include raising and lowering video monitors and computing equipment of all sizes, furniture work surfaces, production assembly tools and lifts, work load transfer equipment, vertically oriented exercise equipment, robot control devices, and windows.

Further, embodiments of the invention may be used to provide forces in orientations other than up and down (e.g., horizontal). Examples of such applications include, but are not limited to continuous constant force feeding systems for machine tools, horizontally oriented exercise equipment, drawer closing applications, and door closing applications.

In some embodiments of the invention may support a display monitor (e.g., a flat panel display such as an liquid crystal display or plasma display) for a personal computer or television. Some situations may not be conducive to placing personal computers and/or display monitors directly on a desk or on a computer case. In some embodiments of the present invention, computer monitors may be mounted on elevating structures to increase desk space or to respond to the ergonomic needs of different operators. In some embodiments of the present invention, monitors may be mounted to a surface (e.g., a wall) instead of placing the monitor on a desk or a cart.

Embodiments of the invention may provide one or more of the following advantages. For example, embodiments of the invention may provide high reliability at a relatively low cost. Some embodiments may be manufactured and/or maintained in a more cost-effective manner than applications using, for example, electrical motors, hydraulic motors, or gas springs as their power source. To illustrate, some embodiments of the present invention may use a coil spring, and a coil spring suitable for use in the present invention may cost, for example, on the order of eighteen cents. In contrast, a gas spring suitable for use in lifting mechanisms may cost about six dollars. By way of another example involving coil spring embodiments, a lift providing support for an 80 pound load through 20 inches of travel using only about four dollars worth of coil springs. In contrast, a prior art lifting technology, capable of supporting a 70 pound load across sixteen inches of travel, may require, for example, two gas springs costing twenty-two dollars each.

In some embodiments, the invention includes a display positioning assembly comprising a support, a display supported by the support, and a balance mechanism carried by the display and operatively connected to the support. The balance mechanism may be useful for balancing forces between the support and the display to provide vertical adjustment of the display relative to the support. Embodiments of the invention also include methods of assembly and use of such an apparatus.

In some embodiments, the invention includes an article for selectively exposing a display comprising a generally planar support surface having a first side and a second side opposite the first side. A balance mechanism operatively connected to a display may be positionable between a storage position proximate the first side of the generally planar support surface and an exposed position proximate the second side of the generally planar support surface. The balance mechanism balances forces between the support surface and the display to provide adjustment of the display relative to the support surface. In some embodiments, the balance mechanism has a fixed component functionally coupled to the generally planar support surface and a movable component functionally coupled to the display, and the fixed component and the movable component may be disposed in sliding or rolling engagement with one another. Embodiments of the invention also include methods of assembly and use of such an apparatus.

In some embodiments, to provide additional safety, the invention includes an assembly for arresting the free fall of an object. The assembly may comprise an outer slide in sliding or rolling engagement with an inner slide, and a brake may be coupled to the inner slide The brake may comprise at least one pivot member and an energy storage member, the energy storage member normally held in expansion by a force, where upon removal of the force the energy storage member biases the pivot member outward to engage the outer slide to prevent the free fall of an object coupled to the inner slide. Embodiments of the invention also include methods of assembly and use of such an apparatus.

DESCRIPTION OF THE DRAWINGS

FIG. 26A is a perspective view of an article with a generally planar support surface in accordance with an exemplary embodiment of the present invention.

FIG. 30A is a side plan view of a slide assembly in accordance with an embodiment of the invention.

FIG. 30B is sectional view of a slide assembly and a brake taken along section line AA of FIG. 30A.

FIG. 30C is an enlarged view of the area within circle B of FIG. 30B.

FIG. 31A is a side plan view of a slide assembly in accordance with an embodiment of the invention.

FIG. 31B is sectional view of a slide assembly and an activated brake taken along section line AA of FIG. 31A.

FIG. 31C is an enlarged view of the area within circle B of FIG. 31B.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
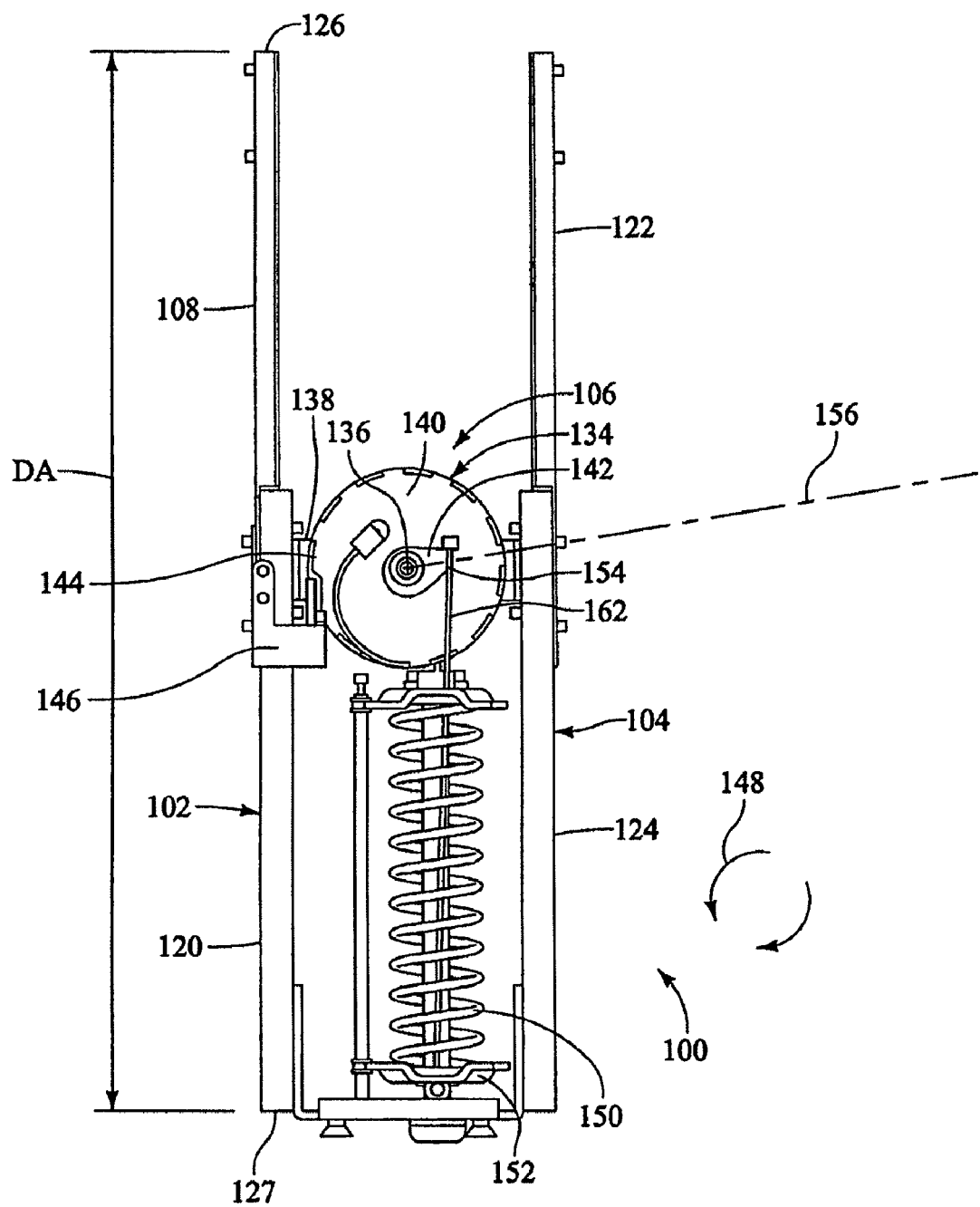
FIG. 1 is an elevation view of an apparatus in accordance with an exemplary embodiment of the present invention.

FIG. 1 is an elevation view of an apparatus 100 in accordance with an exemplary embodiment of the present invention. Apparatus 100 of FIG. 1 comprises a first slide 102, a second slide 104 and a balance mechanism 106. First slide 102 comprises a first inner rail 108 and a first outer rail 120 that are disposed in sliding engagement with one another. In the embodiment of FIG. 1, balance mechanism 106 provides a balancing force between first inner rail 108 and first outer rail 120.

Second slide 104 of apparatus 100 comprises a second inner rail 122 and a second outer rail 124 that are disposed in sliding engagement with one another. In the embodiment of FIG. 1, first slide 102 and second slide 104 are both disposed in a generally extended state. With reference to FIG. 1 it may be appreciated that, distal end 126 of first inner rail 108 is separated from distal end 127 of first outer rail 120 by a distance DA. A wheel 134 of balance mechanism 106 is pivotally supported by first outer rail 120 and second outer rail 124 with wheel 134 being free to rotate about a pivot axis 136. In the embodiment of FIG. 1, wheel 134 is coupled to first outer rail 120 and second outer rail 124 by a flange 138.

In the embodiment of FIG. 1, wheel 134 comprises a pulley member 140 and a cam member 142. Pulley member 140 of wheel 134 is coupled to first inner rail 108 of first slide 102 by a second cable 144 and a bracket 146. In the embodiment of FIG. 1, wheel 134 may be urged to rotate in a counter-clockwise direction 148 by moving distal end 126 of first inner rail 108 toward distal end 127 of first outer rail 120. In some embodiments of the present invention, however, wheel 134 is biased to rotate in a clockwise direction by a spring. This bias provides a balancing force between first inner rail 108 and first outer rail 120

In the embodiment of FIG. 1, cam member 142 of wheel 134 is coupled to a spring 150 by a first cable 162 and a bottom spring plate 152. In FIG. 1 first cable 162 is shown contacting cam member 142 at a first intersection 154. A first reference line 156 is shown passing through pivot axis 136 of wheel 134 and first intersection 154 in FIG. 1.

Figure 2:
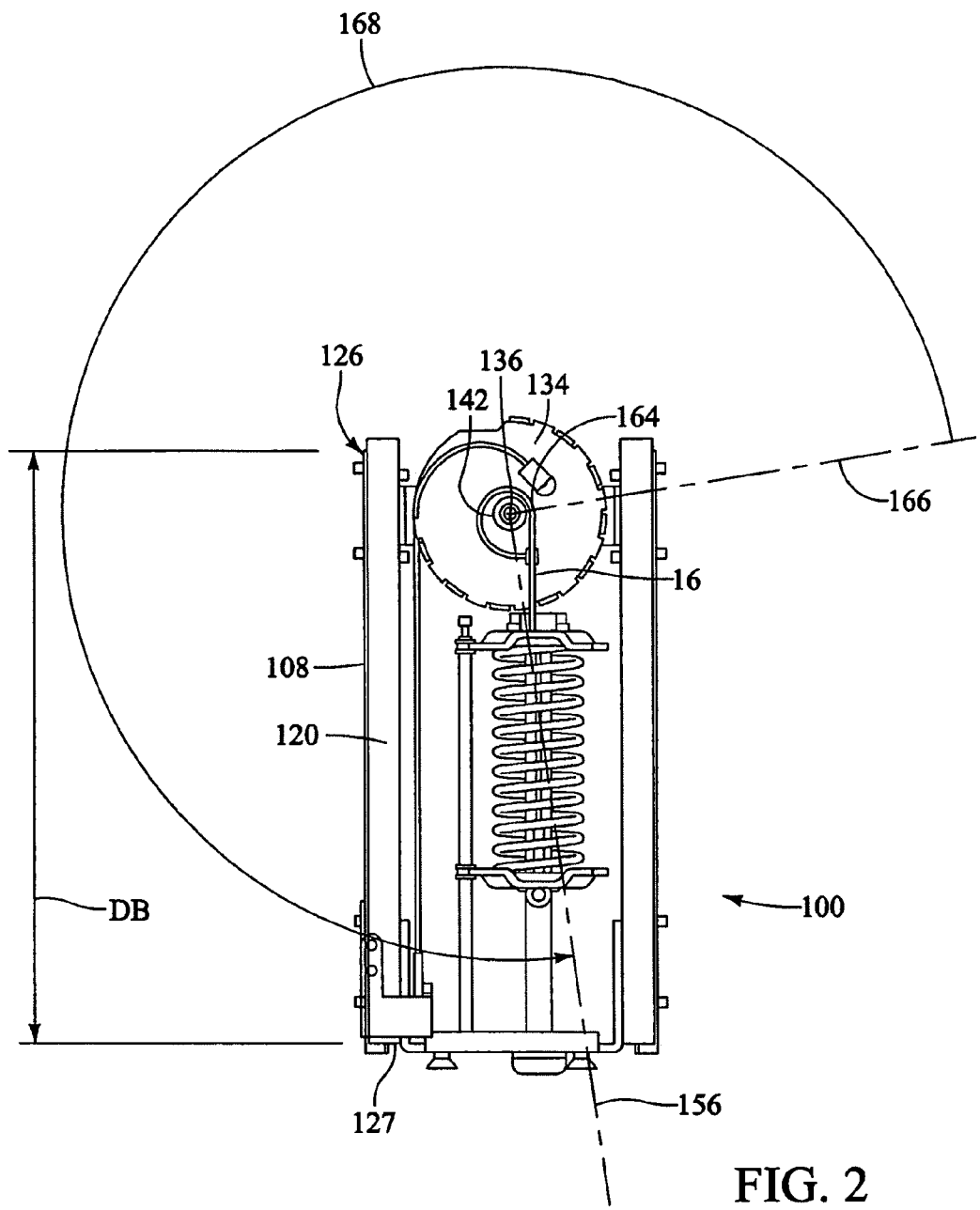
FIG. 2 is an additional elevation view of apparatus shown in the previous figure.

FIG. 2 is an additional elevation view of apparatus 100 shown in the previous figure. In the embodiment of FIG. 2, wheel 134 and first reference line 156 have been rotated in a counter-clockwise direction relative to the positions shown in the previous figure. With reference to the figures, it will be appreciated that first reference line 156 and wheel 134 have been rotated in unison (i.e., first reference line 156 has been rotated by the same angle that wheel 134 has been rotated).

In the embodiment of FIG. 2, apparatus 100 has assumed a generally retracted state in which distal end 126 of first inner rail 108 is located closer to distal end 127 of first outer rail 120 (relative to the state shown in the previous figure). In FIG. 2, the distance between distal end 126 of first inner slide 128 and distal end 127 of first outer rail 120 is labeled DB. With reference to FIG. 2, it will be appreciated that distance DB is smaller than the length of first inner rail 108. It will also be appreciated that distance DB is smaller than distance DA shown in the previous figure.

In FIG. 2, first cable 162 is shown contacting cam member 142 at a second intersection 164. A second reference line 166 is shown passing through pivot axis 136 of wheel 134 and second intersection 164 in FIG. 2. Second reference line 166 and first reference line 156 define an angle 168 in FIG. 2. In the embodiment of FIG. 2, angle 168 represents a rotational range of travel associated with wheel 134. With reference to the figures, it will be appreciated wheel 134 has a first angular orientation corresponding to an expanded configuration of apparatus 100. It will also be appreciated that wheel 134 has a second angular orientation corresponding to a contracted configuration of apparatus 100.

Figure 3:
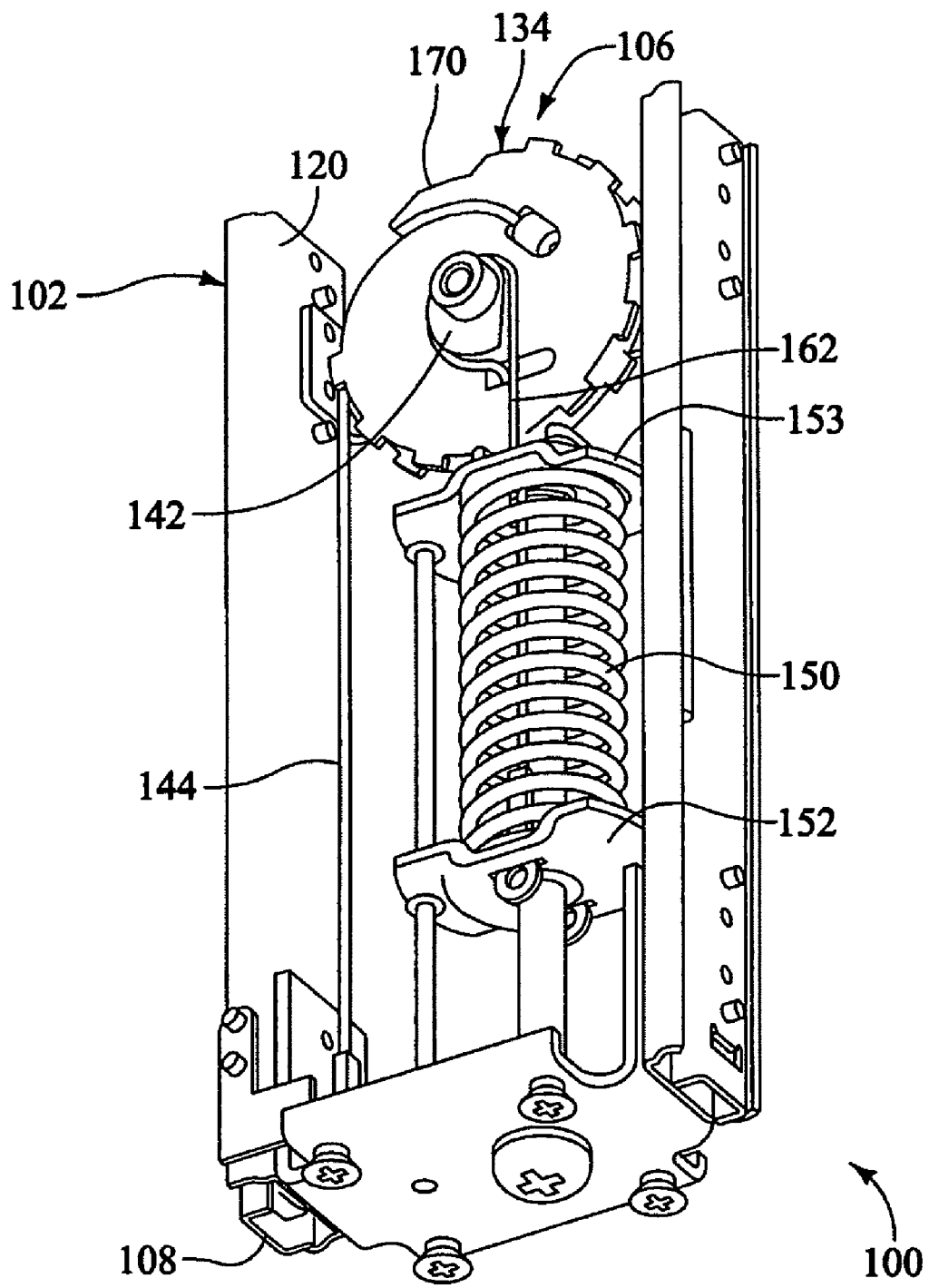
FIG. 3 is a perspective view of apparatus shown in the previous figure.

FIG. 3 is a perspective view of apparatus 100 shown in the previous figure. Apparatus 100 comprises a balance mechanism 106 that is capable of providing a balancing force between first inner rail 108 and first outer rail 120. In the embodiment of FIG. 3, first inner rail 108 is disposed in a generally retracted position with respect to first outer rail 120.

In the embodiment of FIG. 3, balance mechanism 106 comprises a wheel 134 and spring 150. Spring 150 is disposed between a bottom spring plate 152 and a top spring plate 153 in FIG. 3. In the embodiment of FIG. 3, spring 150 is capable of assuming a relaxed shape and a plurality of compressed shapes. For example, spring 150 may assume a completely relaxed shape when no forces act on spring 150 to hold it in compression. In the embodiment of FIG. 3, spring 150 is pictured having a somewhat compressed shape relative to its relaxed shape.

Spring 150 is coupled to a cam member 142 of wheel 134 by a first cable 162 so that spring 150 biases wheel 134 to rotate in a clockwise direction. A pulley portion 170 of wheel 134 is coupled to a first inner rail 108 of a first slide 102 by a second cable 144. A balancing force is applied between first inner rail 108 and first outer rail 120 by second cable 144 and wheel 134 of balance mechanism 106. In some useful embodiments of the present invention, cam member 142 is shaped and positioned so that a torque applied to wheel 134 by first cable 162 is substantially constant while a force applied to wheel 134 by first cable 162 varies. When this is the case, second cable 144 preferably applies a substantially constant balancing force to first inner rail 108.

Figure 4:
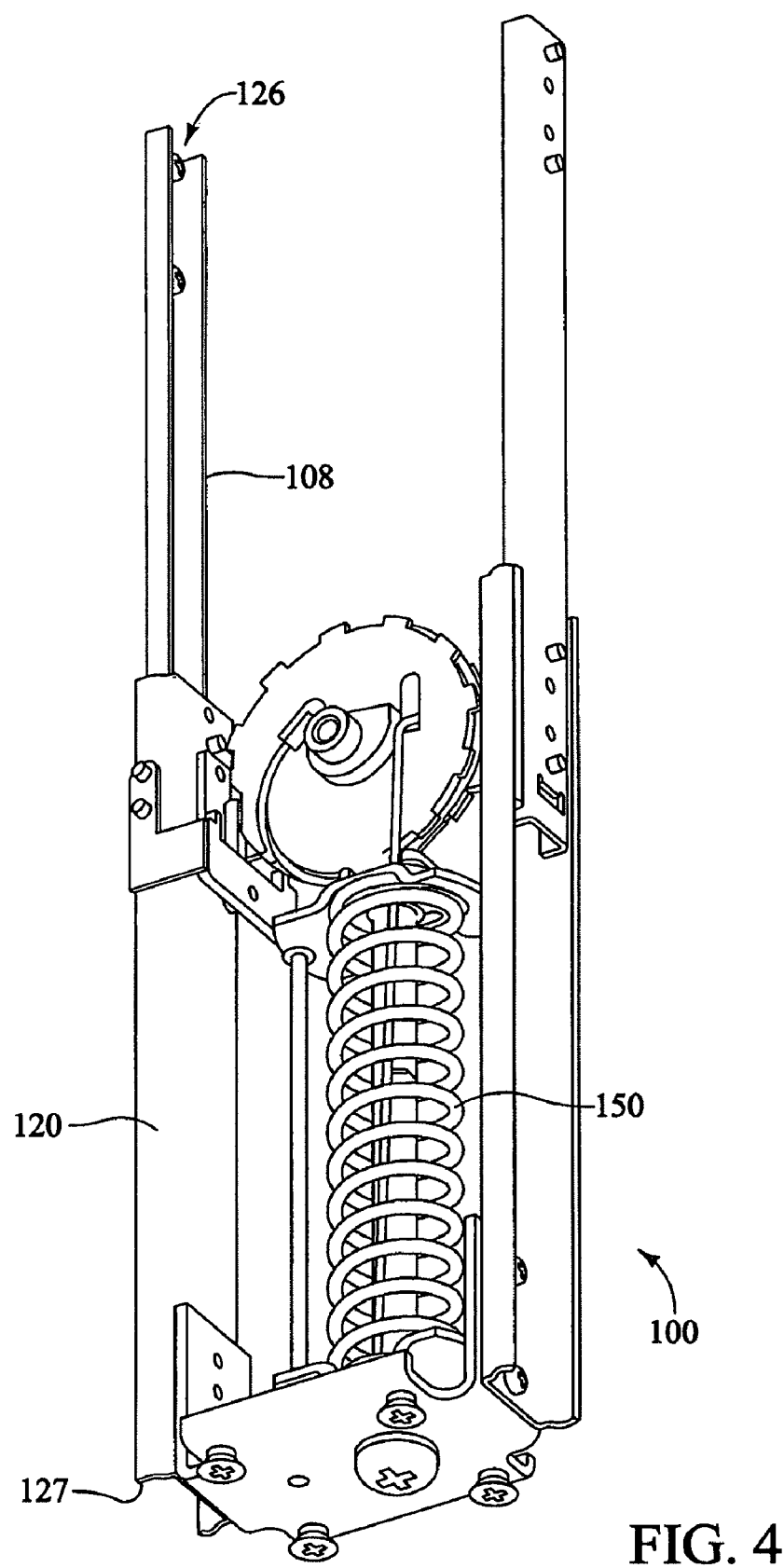
FIG. 4 is an additional perspective view of apparatus shown in the previous figure.

FIG. 4 is an additional perspective view of apparatus 100 shown in the previous figure. In FIG. 4, spring 150 is shown assuming a shape that is less compressed than the shape shown in the previous figure. In the embodiment of FIG. 4, first inner rail 108 is disposed in a generally extended position with respect to first outer rail 120. Accordingly, apparatus 100 is shown in a generally extended state in which distal end 126 of first inner rail 108 is located farther from distal end 127 of first outer rail 120 (relative to the state shown in the previous figure).

Figure 5:
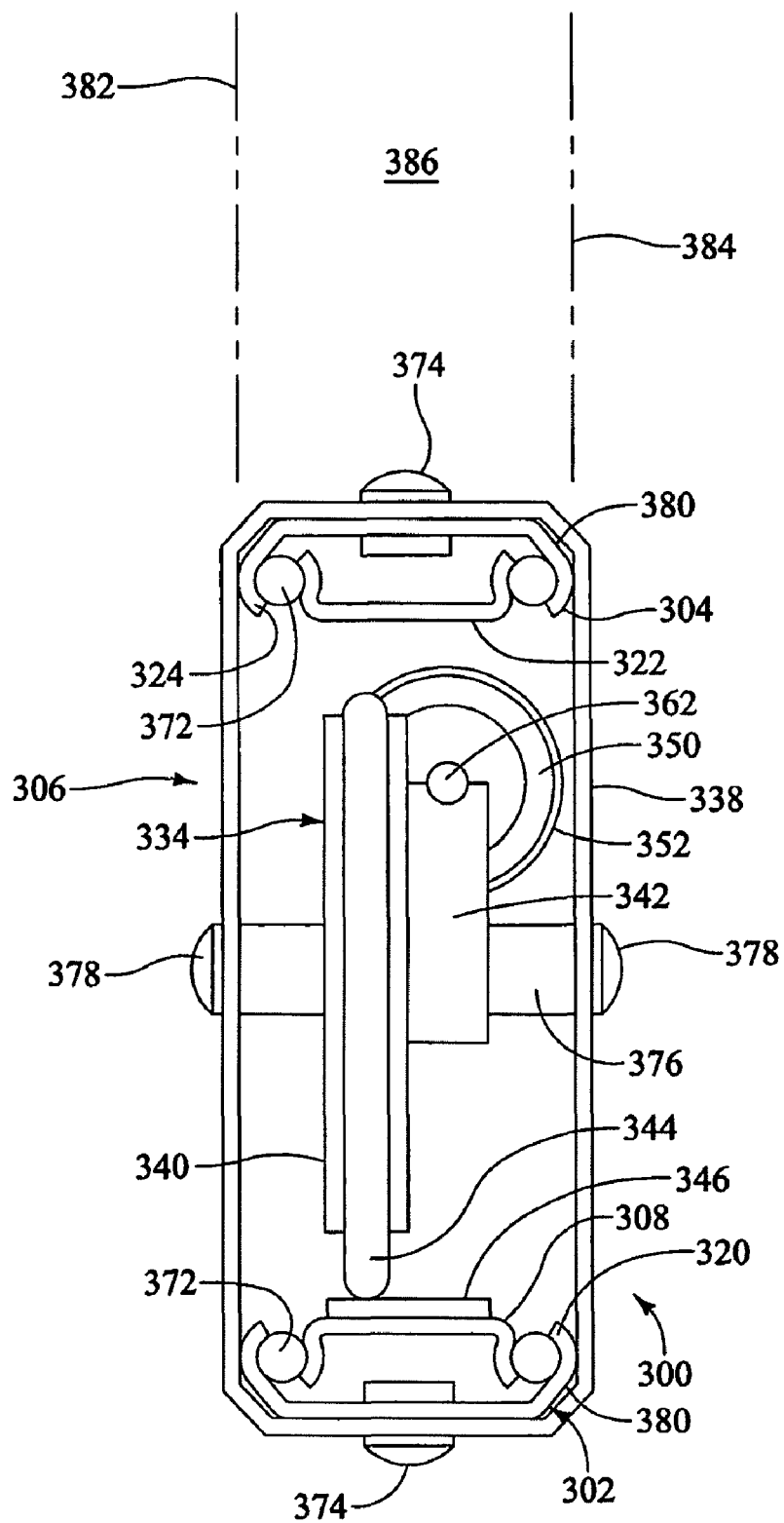
FIG. 5 is a plan view of an apparatus in accordance with an additional exemplary embodiment of the present invention.

FIG. 5 is a plan view of an apparatus 300 in accordance with an additional exemplary embodiment of the present invention. Apparatus 300 of FIG. 5 comprises a first slide 302 including a first inner rail 308 and a first outer rail 320. With reference to FIG. 5, it may be appreciated that a plurality of balls 372 are disposed between first inner rail 308 and first outer rail 320. Apparatus 300 also comprises a second slide 304 including a second inner rail 322, a second outer rail 324 and a plurality of balls 372 disposed therebetween.

In FIG. 5, a flange 338 is shown disposed about first slide 302 and second slide 304. Flange 338 is fixed to first outer rail 320 of first slide 302 by a fastener 374. A second fastener 374 is shown fixing second outer rail 324 to flange 338. In the embodiment of FIG. 5, a shaft 376 is fixed to flange 338 by a plurality of fasteners 378. In the embodiment of FIG. 5, shaft 376 rotatably supports a wheel 334 of a balance mechanism 306.

In the embodiment of FIG. 5, balance mechanism 306 also comprises a spring 350. A cam member 342 of wheel 334 is coupled to spring 350 by a first cable 362 and a bottom spring plate 352. A pulley member 340 of wheel 334 is coupled to first inner rail 308 of first slide 302 by a second cable 344 and a bracket 346. Balance mechanism 306 may advantageously provide a balancing force between first inner rail 308 and first outer rail 320 in the embodiment of FIG. 5. In some useful embodiments of the present invention, cam member 342 is shaped and positioned so that a torque applied to wheel 334 by first cable 362 is substantially constant while a force applied to wheel 334 by first cable 362 varies. When this is the case, second cable 344 preferably applies a substantially constant balancing force to first inner rail 308.

With reference to FIG. 5, it will be appreciated that an outside surface 380 of first outer rail 320 and an outside surface 380 of second outer rail 324 define a first reference plane 382 and a second reference plane 384. In the embodiment of FIG. 5, balance mechanism 306 is disposed between first reference plane 382 and second reference plane 384. Also in the embodiment of FIG. 5, balance mechanism 306 is disposed within a projection 386 defined by outside surface 380 of first outer rail 320. In FIG. 5, projection 386 extends between first reference plane 382 and second reference plane 384.

Figure 6:
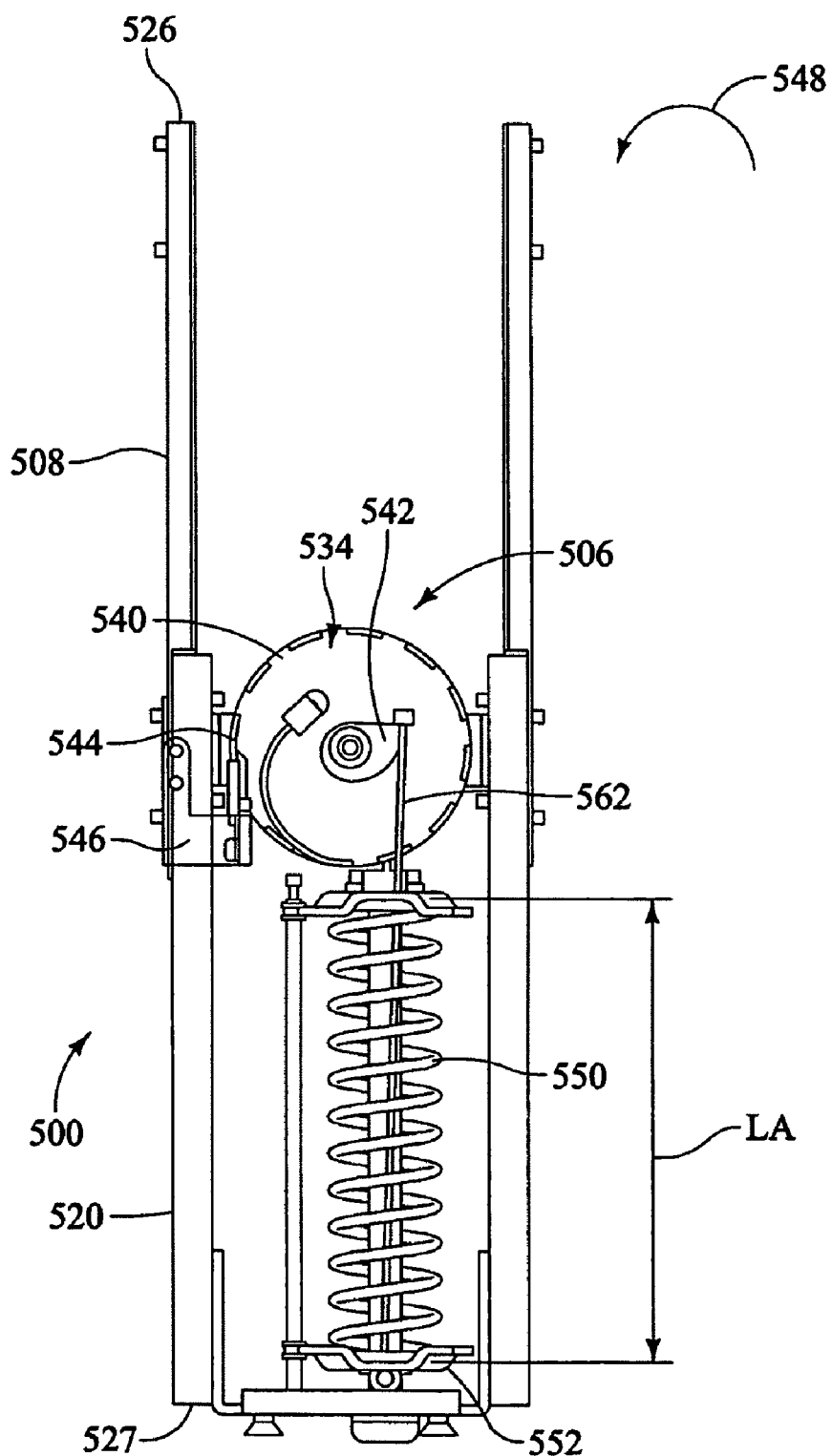
FIG. 6 is an elevation view of an apparatus in accordance with an exemplary embodiment of the present invention.

FIG. 6 is an elevation view of an apparatus 500 in accordance with an exemplary embodiment of the present invention. Apparatus 500 of FIG. 6 includes a balance mechanism 506 that is coupled between a first inner rail 508 and a first outer rail 520. Balance mechanism 506 may advantageously provide a balancing force between first inner rail 508 and first outer rail 520. In the embodiment of FIG. 6, balance mechanism 506 comprises a wheel 534 and a spring 550.

In the embodiment of FIG. 6, wheel 534 comprises a cam member 542 that is coupled to spring 550 by a first cable 562 and a bottom spring plate 552. In some useful embodiments of the present invention, cam member 542 is shaped and positioned so that a torque applied to wheel 534 by spring 550 is substantially constant while a force applied to wheel 534 by spring 550 varies. The force provided by spring 550 may vary, for example, as the deflection of spring 550 varies.

In the embodiment of FIG. 6, spring 550 is capable of assuming a relaxed shape and a plurality of compressed shapes. For example, spring 550 may assume a completely relaxed shape when no forces act on spring 550 to hold it in compression. In the embodiment of FIG. 6, spring 550 is pictured having a somewhat compressed shape relative to its relaxed shape. When spring 550 assumes the shape shown in FIG. 6, spring 550 has a length LA.

In the embodiment of FIG. 6, wheel 534 comprises a pulley member 540 that is coupled to first inner rail 508 of first slide 502 by a bracket 546 and a second cable 544. Accordingly, wheel 534 may be urged to rotate in a counter-clockwise direction 548 by moving distal end 526 of first inner rail 508 toward distal end 527 of first outer rail 520. In some useful embodiments of the present invention, second cable 544 applies a substantially constant balancing force to first inner rail 508.

Figure 7:
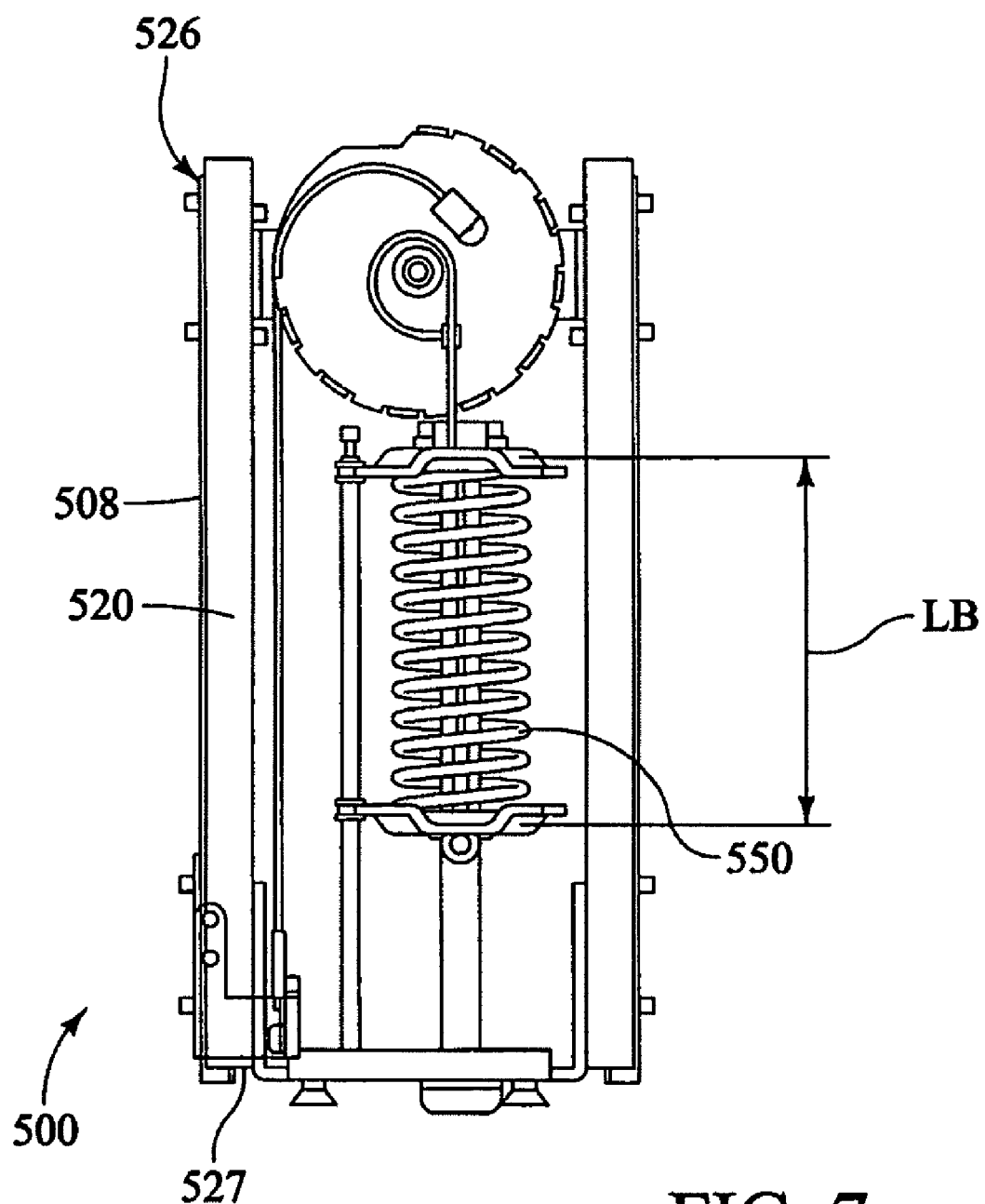
FIG. 7 is an additional elevation view of apparatus shown in the previous figure.

FIG. 7 is an additional elevation view of apparatus 500 shown in the previous figure. In the embodiment of FIG. 7, apparatus 500 is shown in a generally retracted state in which distal end 526 of first inner rail 508 is located closer to distal end 527 of first outer rail 520 (relative to the state shown in the previous figure). An over-all length of spring 550 is labeled LB in FIG. 7. In FIG. 7, spring 550 is shown assuming a shape that is more compressed than the shape shown in the previous figure. Accordingly, length LB shown in FIG. 7 is generally smaller than length LA shown in the previous figure.

Figure 8:
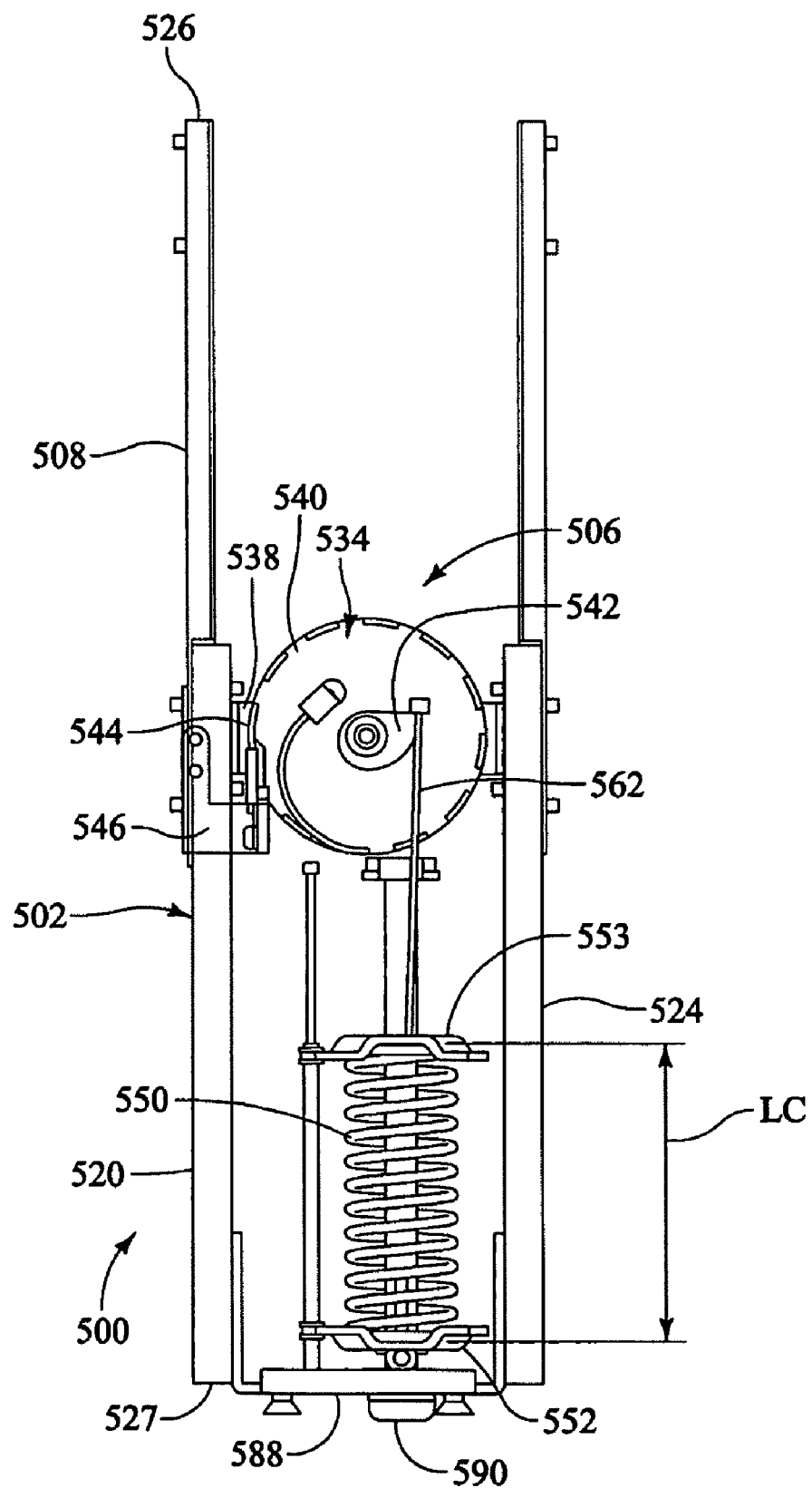
FIG. 8 is an additional elevation view of apparatus shown in the previous figure.

FIG. 8 is an additional elevation view of apparatus 500 shown in the previous figure. Apparatus 500 of FIG. 8 includes a balance mechanism 506 comprising a spring 550 that is disposed between a bottom spring plate 552 and a top spring plate 553. Top spring plate 553 is coupled to a base 588 of apparatus 500 by an adjustment screw 590. The distance between top spring plate 553 and base 588 can be adjusted by rotating adjustment screw 590.

In the embodiment of FIG. 8, top spring plate 553 has been positioned so that spring 550 has assumed a length LC. With reference to the figures, it will be appreciated that length LC is generally smaller than length LA shown in FIG. 6. In the embodiment of FIG. 8, spring 550 is capable of assuming a relaxed shape and a plurality of compressed shapes. For example, spring 550 may assume a completely relaxed shape when no forces act on spring 550 to hold it in compression. In the embodiment of FIG. 8, spring 550 is pictured having a somewhat compressed shape relative to its relaxed shape.

Base 588 of apparatus 500 is coupled to a first outer rail 520 and a second outer rail 524. A flange 538 of apparatus 500 is also coupled to first outer rail 520 and second outer rail 524. A wheel 534 of a balance mechanism 506 is pivotally supported by flange 538, first outer rail 520 and second outer rail 524. In the embodiment of FIG. 8, balance mechanism 506 is coupled between a first inner rail 508 and a first outer rail 520. Balance mechanism 506 may advantageously provide a balancing force between first inner rail 508 and first outer rail 520. In the embodiment of FIG. 8, the balancing force provided by balance mechanism 506 can be adjusted by rotating adjustment screw 590.

In the embodiment of FIG. 8, wheel 534 of balance mechanism comprises a cam member 542 that is coupled to spring 550 by a first cable 562 and a bottom spring plate 552. In some useful embodiments of the present invention, cam member 542 is shaped and positioned so that a torque applied to wheel 534 by spring 550 is substantially constant while a force applied to wheel 534 by spring 550 varies. The force provided by spring 550 may vary, for example, as the deflection of spring 550 varies.

In the embodiment of FIG. 8, wheel 534 comprises a pulley member 540 that is coupled to first inner rail 508 of first slide 502 by a bracket 546 and a second cable 544. Accordingly, wheel 534 may be urged to rotate in a counter-clockwise direction 548 by moving distal end 526 of first inner rail 508 toward distal end 527 of first outer rail 520. In some useful embodiments of the present invention, second cable 544 applies a substantially constant balancing force to first inner rail 508.

Figure 9:
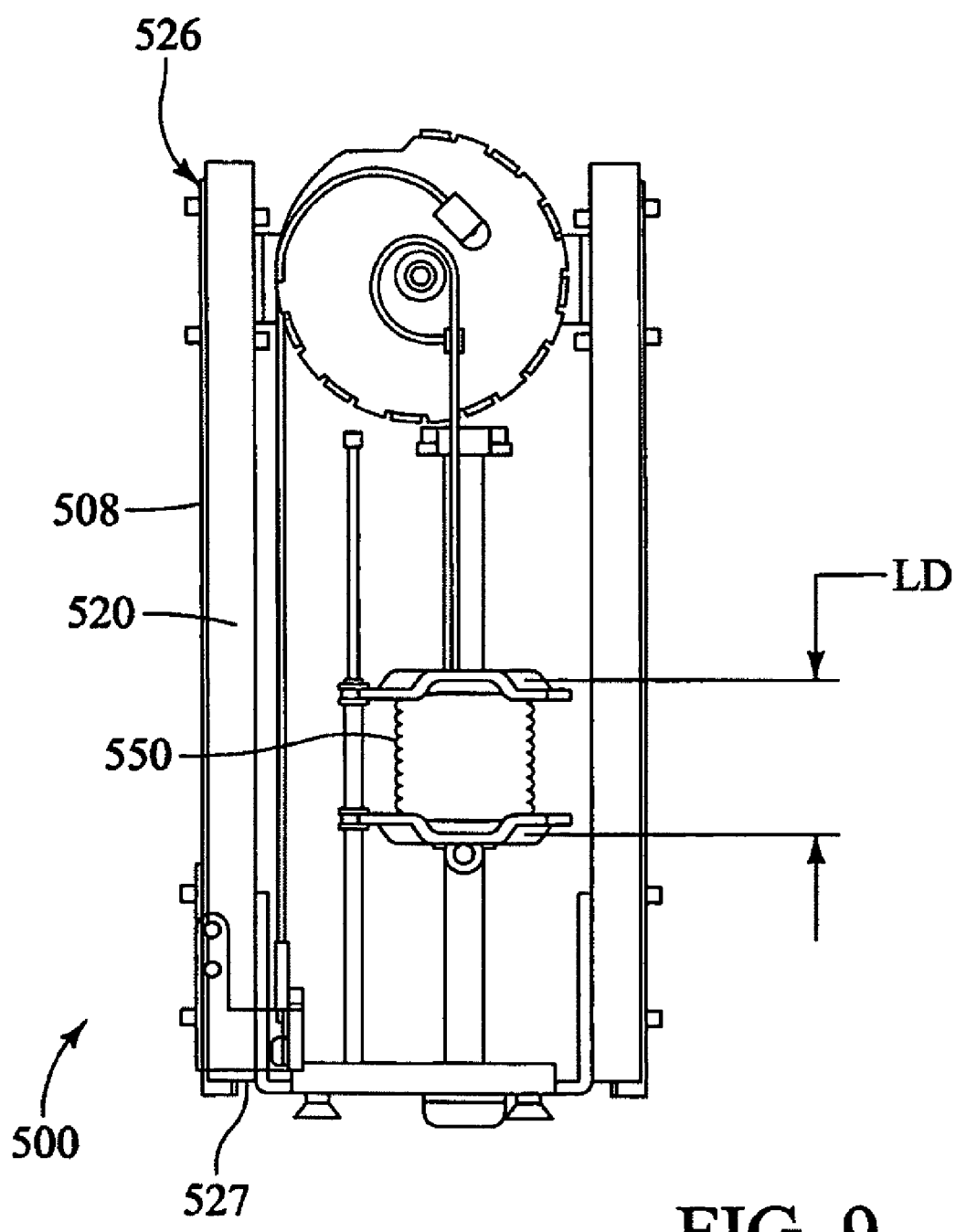
FIG. 9 is an additional elevation view of apparatus shown in the previous figure.

FIG. 9 is an additional elevation view of apparatus 500 shown in the previous figure. In the embodiment of FIG. 9, apparatus 500 is shown in a generally retracted state in which distal end 526 of first inner rail 508 is located closer to distal end 527 of first outer rail 520 (relative to the state shown in the previous figure). An over-all length of spring 550 is labeled LD in FIG. 9. In FIG. 9, spring 550 is shown assuming a shape that is more compressed than the shape shown in the previous figure. Accordingly, length LD shown in FIG. 9 is generally smaller than length LC shown in the previous figure.

Figure 10:
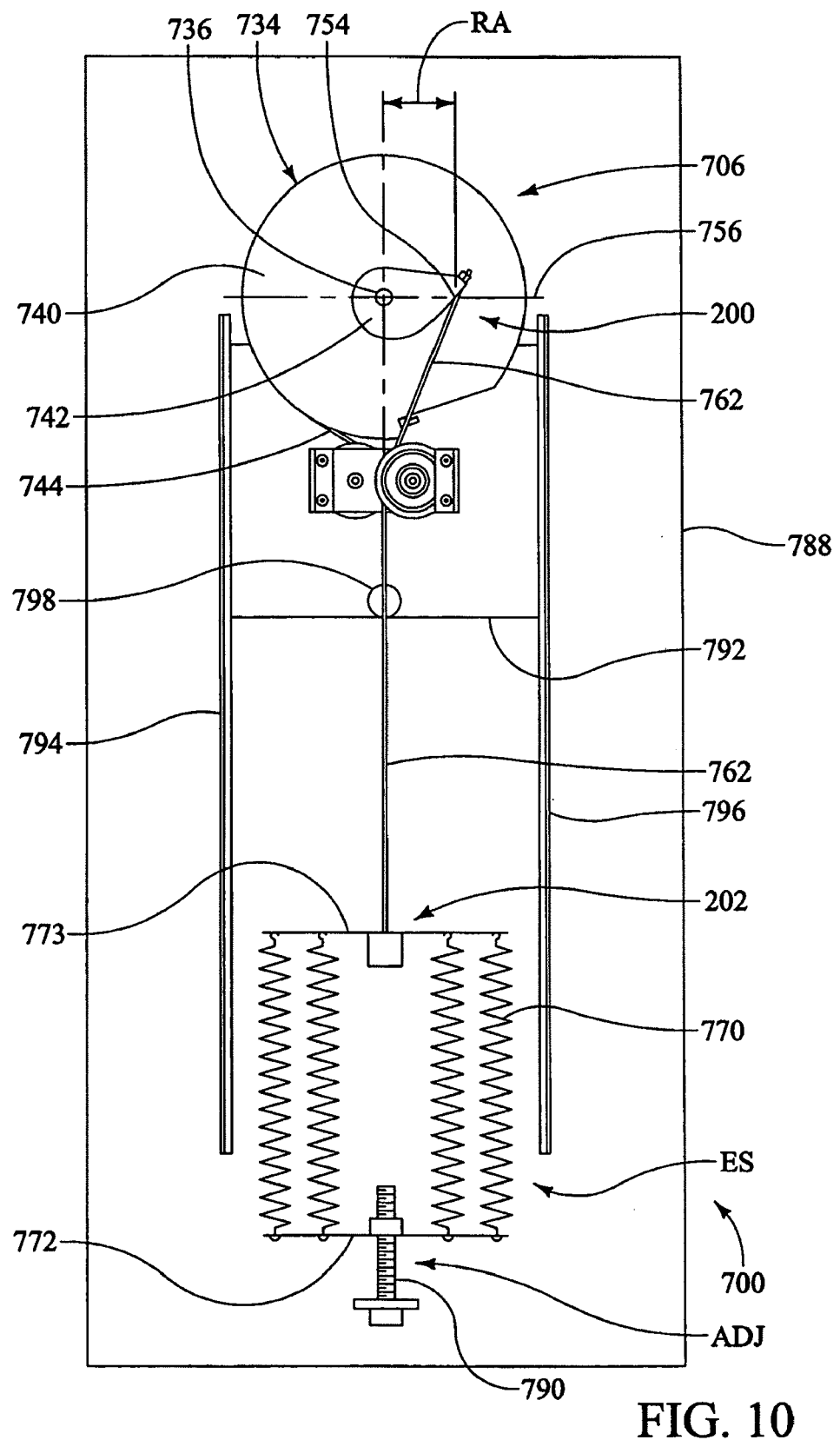
FIG. 10 is a front view of an apparatus in accordance with an additional exemplary embodiment of the present invention.

FIG. 10 is a front view of an apparatus 700 in accordance with an additional exemplary embodiment of the present invention. Apparatus 700 comprises a base 788 and a trolley 792 that is preferably free to move relative to base 788. In the embodiment of FIG. 10, the motion of trolley 792 is guided by a first guide 794 and a second guide 796.

Apparatus 700 also comprises a balance mechanism 706 for providing a balancing force between trolley 792 and base 788. In the embodiment of FIG. 10, balance mechanism 706 includes a wheel 734 comprising a pulley member 740 and a cam member 742. In the embodiment of FIG. 10, a second cable 744 is shown extending between the pulley member 740 and trolley 792. Second cable 744 is attached to trolley 792 at an anchor 798. Anchor 798 is represented by a circle in FIG. 10.

Apparatus 700 also comprises a first cable 762 having a first end 200 and a second end 202. Second end 202 of first cable 762 is represented by a square in FIG. 10. In the embodiment of FIG. 10, first end 200 of a first cable 762 is connected to cam member 742 of wheel 734. A force F is shown acting on first cable 762 proximate second end 202 thereof.

In the embodiment of FIG. 10, apparatus 700 first cable 762 connects the cam member of the wheel to an energy source ES for biasing the wheel to rotate in a first direction. In some useful embodiments of the present invention, the cam member is shaped and positioned so that a torque applied to the wheel by the first cable is substantially constant or varied in a pre-determined manner while an output of the energy source varies.

In the embodiment of FIG. 10, energy source ES comprises a plurality of extension springs 770. In this exemplary embodiment, the output of energy source ES may vary as a function of a deflection of the extension springs 770. Apparatus 700 of FIG. 10 also includes an adjustment mechanism ADJ that may be used to vary an output of energy source ES. With reference to FIG. 10, it will be appreciated that extension springs 770 extend between a bottom spring plate 772 and a top spring plate 773. Bottom spring plate 772 is coupled to a base 788 of apparatus 700 by an adjustment screw 790. The position of bottom spring plate 772 relative to base 788 can be adjusted by rotating adjustment screw 790.

In the embodiment of FIG. 10, wheel 734 is pivotally supported by base 788 so that wheel 734 pivots about a pivot axis 736. In FIG. 10, first cable 762 is shown contacting cam member 742 at a first intersection 754. A first reference line 756 is shown passing through pivot axis 736 of wheel 734 and first intersection 754 in FIG. 10. In the embodiment of FIG. 10, first intersection 754 and pivot axis 736 are separated by a first radius RA.

In some useful embodiments of the present invention, cam member 742 is shaped and positioned so that a torque applied to wheel 734 by first cable 762 is substantially constant while a force applied to wheel 734 by first cable 762 varies. In some embodiments of the present invention, for example, the effective radius of cam member 742 varies as a function of the angular orientation of wheel 734. Also in some useful embodiments of the present invention, the effective radius of cam member 742 may vary as a function of the displacement of a spring of balance mechanism 706.

Figure 11:
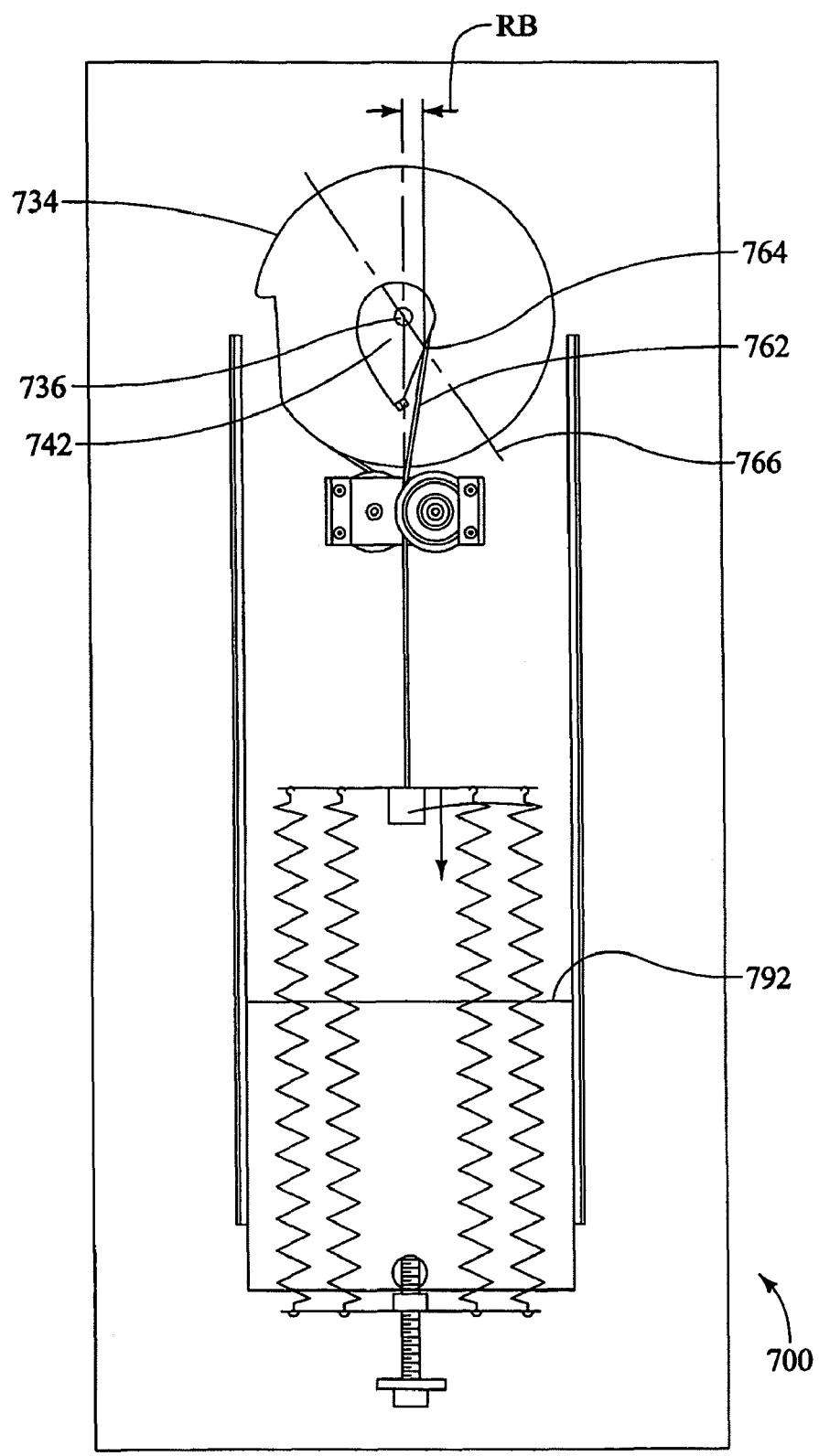
FIG. 11 is an additional front view of apparatus shown in the previous figure.

FIG. 11 is an additional front view of apparatus 700 shown in the previous figure. With reference to the figures, it will be appreciated wheel 734 has a first angular orientation corresponding to a first position of trolley 792 and a second angular orientation corresponding to a second position of trolley 792. The first position of trolley 792 is shown in the previous figure and the second position of trolley 792 is shown in FIG. 11.

In FIG. 11, first cable 762 is shown contacting cam member 742 at a second intersection 764. A second reference line 766 is shown passing through pivot axis 736 of wheel 734 and second intersection 764 in FIG. 11. In the embodiment of FIG. 10, second intersection 764 and pivot axis 736 are separated by a second radius RB. With reference to the figures, it will be appreciated that radius RB is generally smaller than radius RA shown in the previous figure.

Figure 12:
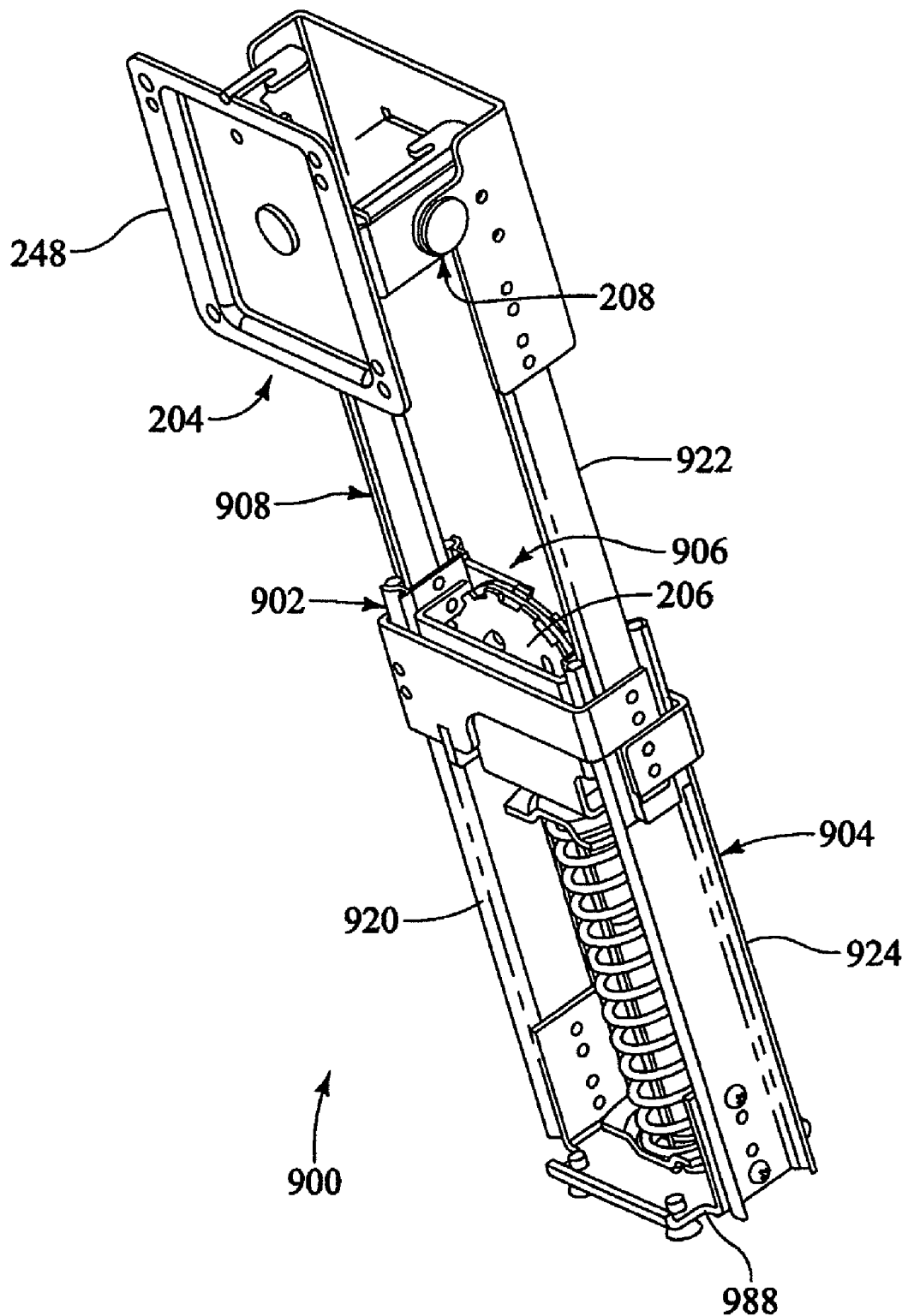
FIG. 12 is a perspective view of an apparatus in accordance with an exemplary embodiment of the present invention.

FIG. 12 is a perspective view of an apparatus 900 in accordance with an exemplary embodiment of the present invention. Apparatus 900 of FIG. 12, comprises a head 204 that is slidingly coupled to a base 988 by a first slide 902 and a second slide 904. In the embodiment of FIG. 12, head 204 is connected to a first inner rail 908 of a first slide 902 and a second inner rail 922 of a second slide 904. In FIG. 12, base 988 is shown connected to a first outer rail 920 of first slide 902 and a second outer rail 924 of second slide 904. Apparatus 900 of FIG. 12 also includes a balance mechanism 906 that is coupled between base 988 and head 204 for providing a balancing force. In the embodiment of FIG. 12, balance mechanism 906 comprises a wheel 206.

A mounting bracket 248 is coupled to head 204 by a pivot mechanism 208 in the embodiment of FIG. 12. A device such as, for example, an electronic display may be fixed to mounting bracket 248 so that apparatus 900 supports the device at a desired position. In the embodiment of FIG. 12, pivot mechanism 208 advantageously provides a tilting motion to mounting bracket 248 so that mounting bracket 248 can be arranged at a desired angle of tilt. In a preferred embodiment, head 204 and base 988 are moveable relative to one another for selectively repositioning the device. For example, head 204 may be raised and lowered relative to base 988.

Figure 13:
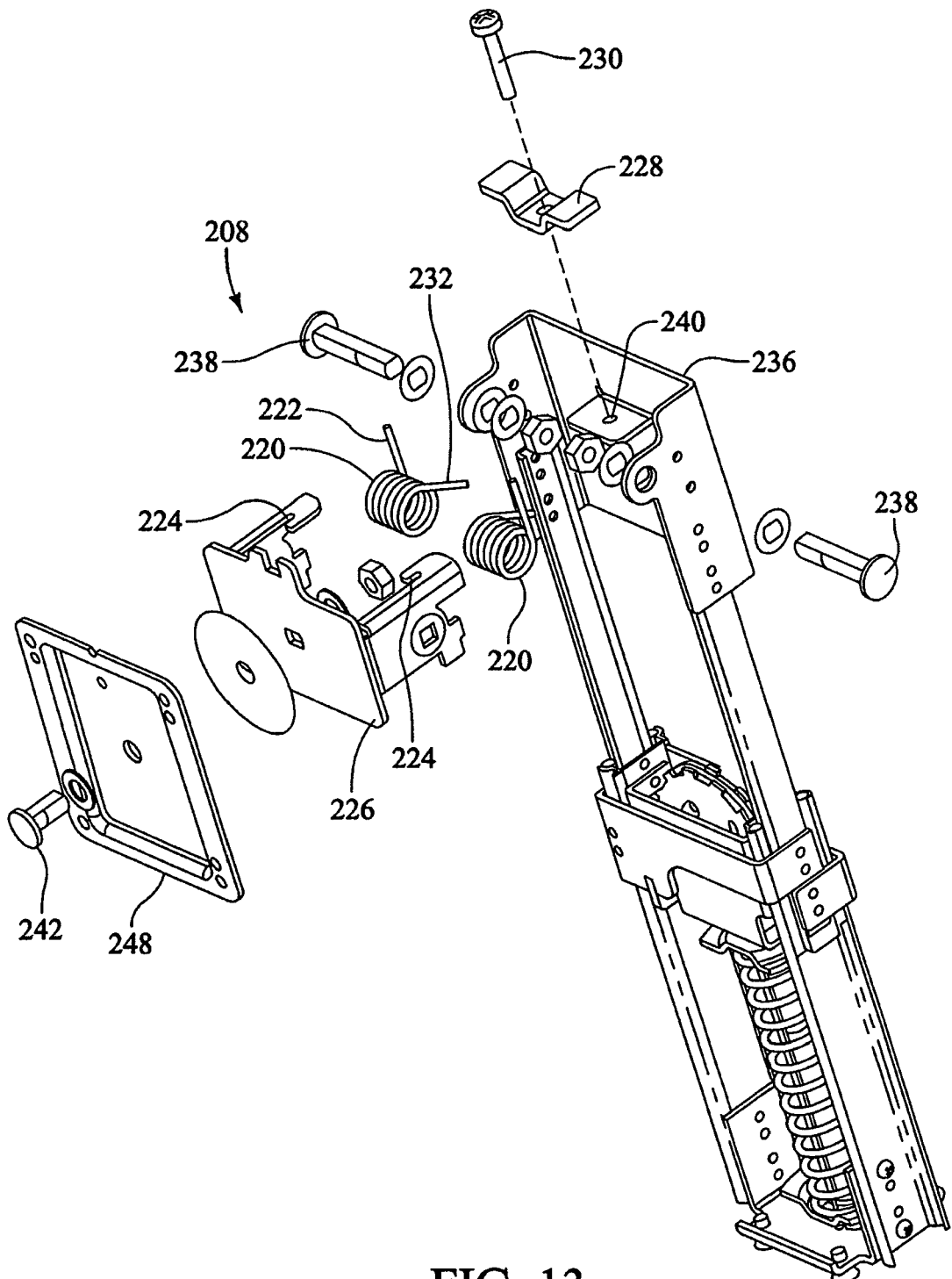
FIG. 13 is an exploded view of the apparatus shown in the previous figure.

FIG. 13 is an exploded view of apparatus 900 shown in the previous figure. In FIG. 13, it may be appreciated that pivot mechanism 208 comprises a plurality of torsion springs 220. A first leg 222 of each torsion spring 220 engages a notch 224 defined by a first structural member 226. An adjustment plate 228 engages a second leg 232 of each torsion spring 220. A tilt adjust screw 230 may be used to adjust the position of second leg 232 of each torsion spring 220.

First structural member 226 may be pivotally attached to a second structural member 236 by a plurality of bolts 238. In FIG. 13, it may be appreciated that second structural member 236 defines a threaded hole 240. Threaded hole 240 is preferably adapted to receive tilt adjust screw 230. A mounting bracket 248 may be pivotally connected to first structural member 226 by a bolt 242.

Figure 14:
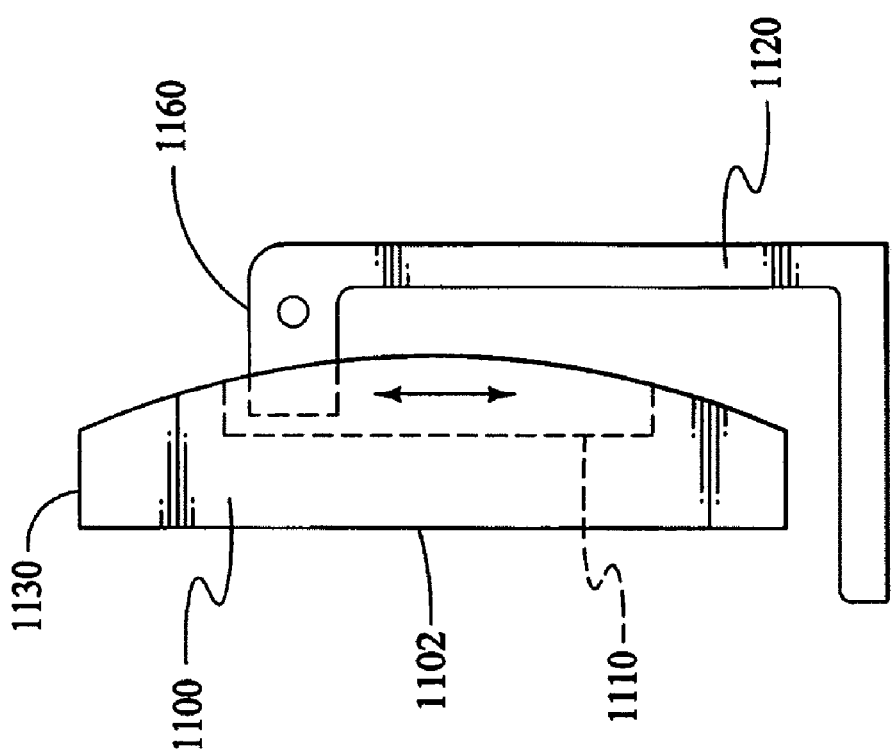
FIG. 14 is a side plan view of a display and stand in accordance with an additional exemplary embodiment of the present invention.
Figure 15:
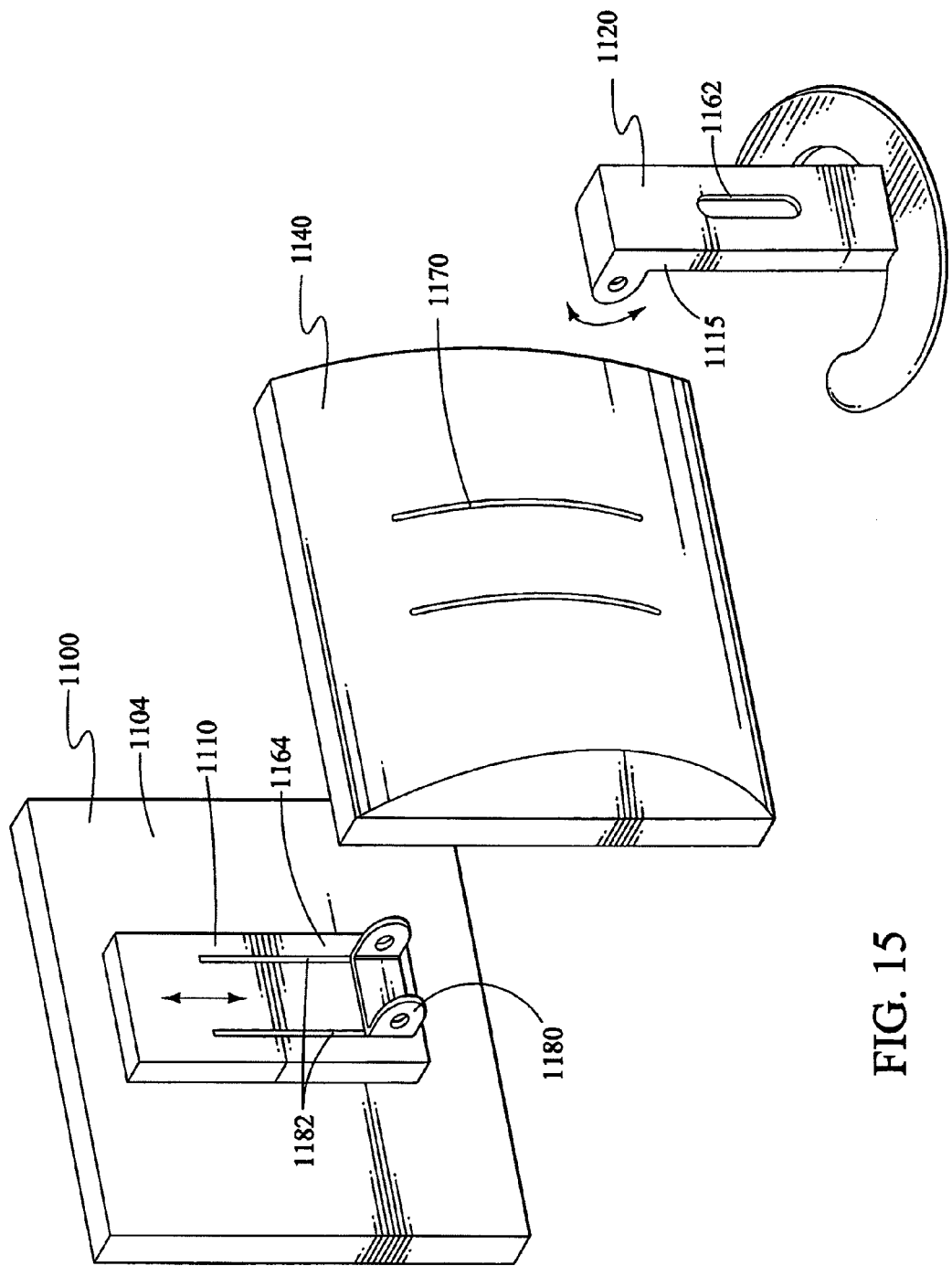
FIG. 15 is an exploded perspective view of a display and stand in accordance with an exemplary embodiment of the present invention.

As previously described, any of the various balance mechanisms 106 discussed herein may be utilized to lift a display 1100, such as a flat panel display for a computer or television (e.g., LCD or plasma). Generally, a display 1100 has a first side adapted to show an image and a second side 1104 opposite the first side, as shown in FIGS. 14 and 15.

As shown in FIGS. 14-17B, a balance mechanism 1110, such as any of the balancing mechanisms described herein, may be carried by (e.g., on or within) the display 1100. Such balance mechanisms may be attached to a support 1120, such as a stand or wall mount, to provide a non-telescoping vertical adjustment of display 1100.

Figure 16:
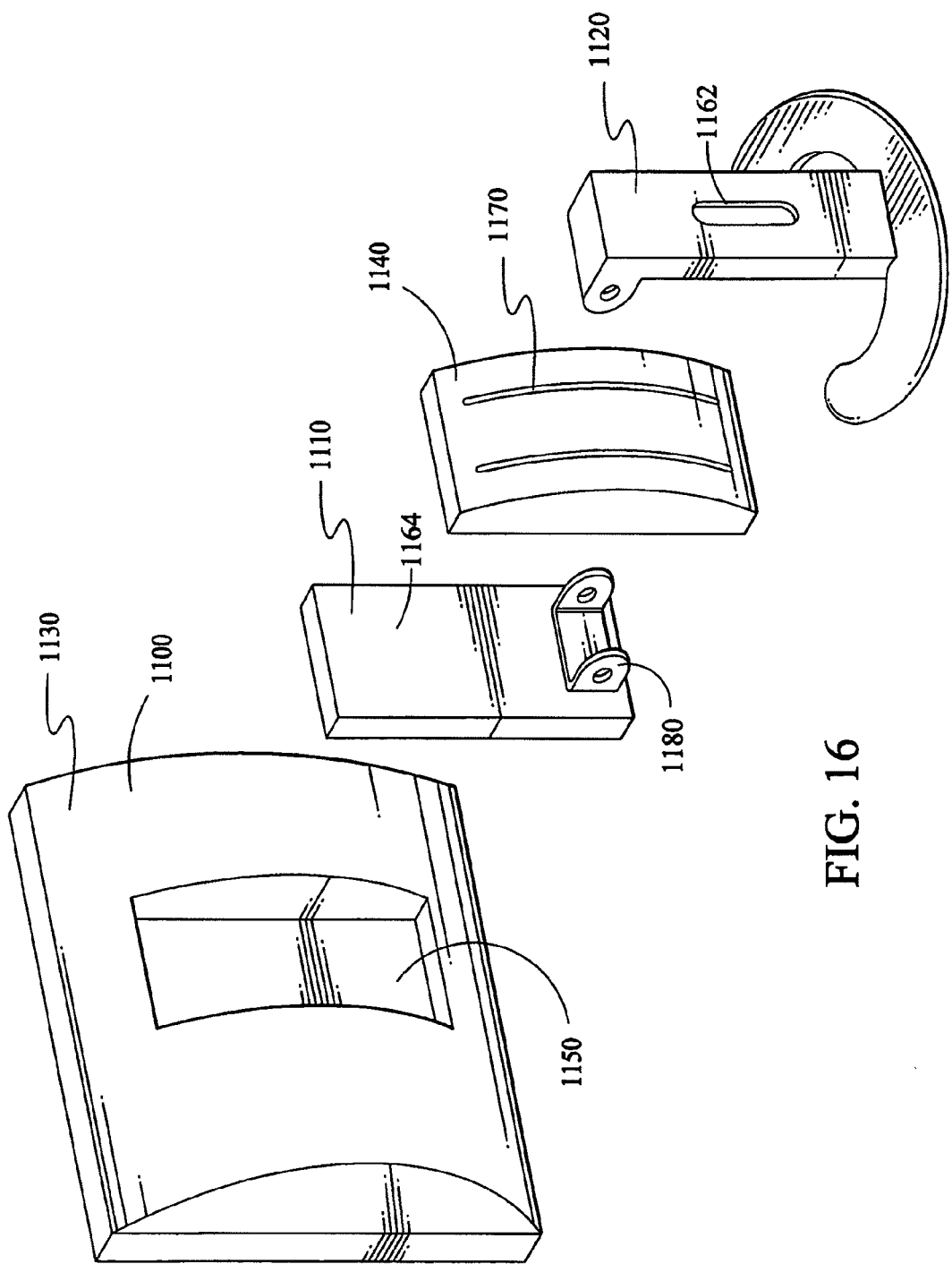
FIG. 16 is an exploded perspective view of a display and stand in accordance with an exemplary embodiment of the present invention.
Figure 17B:
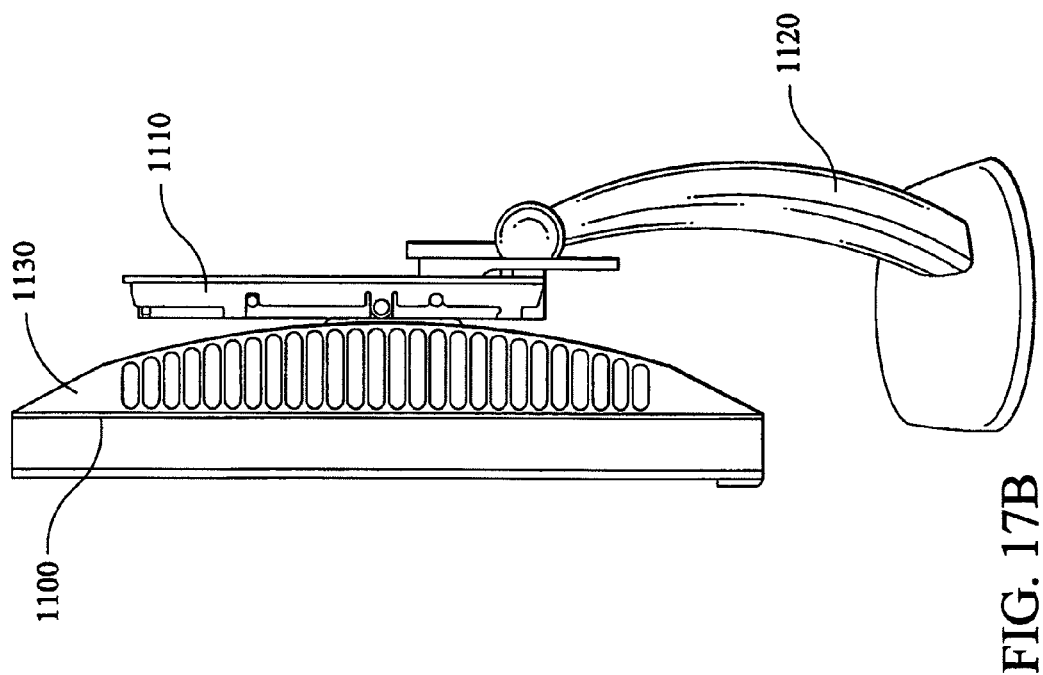
FIGS. 17A and B are side plan views of a display and stand in accordance with an exemplary embodiment of the present invention.
Figure 17A:
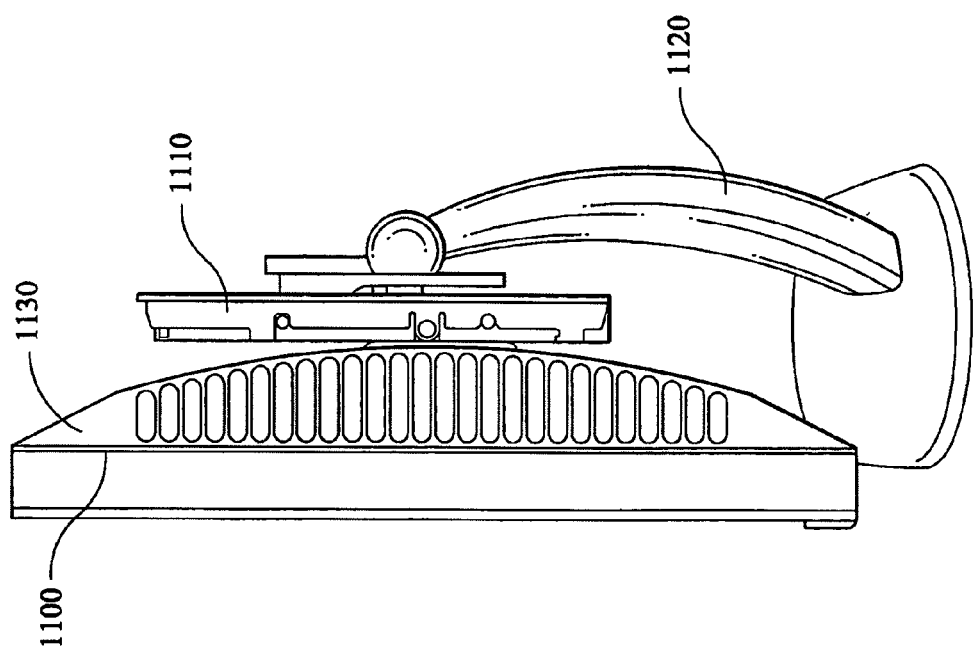

The balance mechanism may be carried on or within the display 1100 in any suitable location. For example, the balance mechanism may be enclosed within the display housing 1130. As shown in FIGS. 15 and 16, a cover 1140 may enclose the balance mechanism so that it is not visible to the operator as the display moves up and down. In such embodiments, a cavity 1150 sized to receive the balance mechanism may be included proximate the second side 1004 of the display. In other embodiments, the balance mechanism may be carried on the exterior of the display, as shown in FIGS. 17A & B.

Figure 18B:
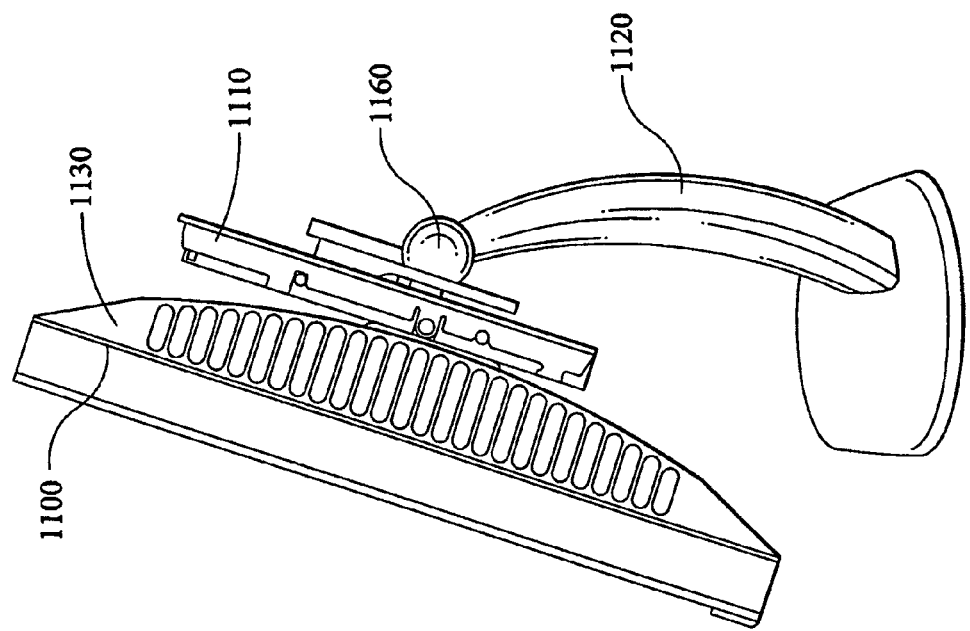
FIGS. 18A and B are side plan views of a display and stand in accordance with an exemplary embodiment of the present invention.
Figure 18A:
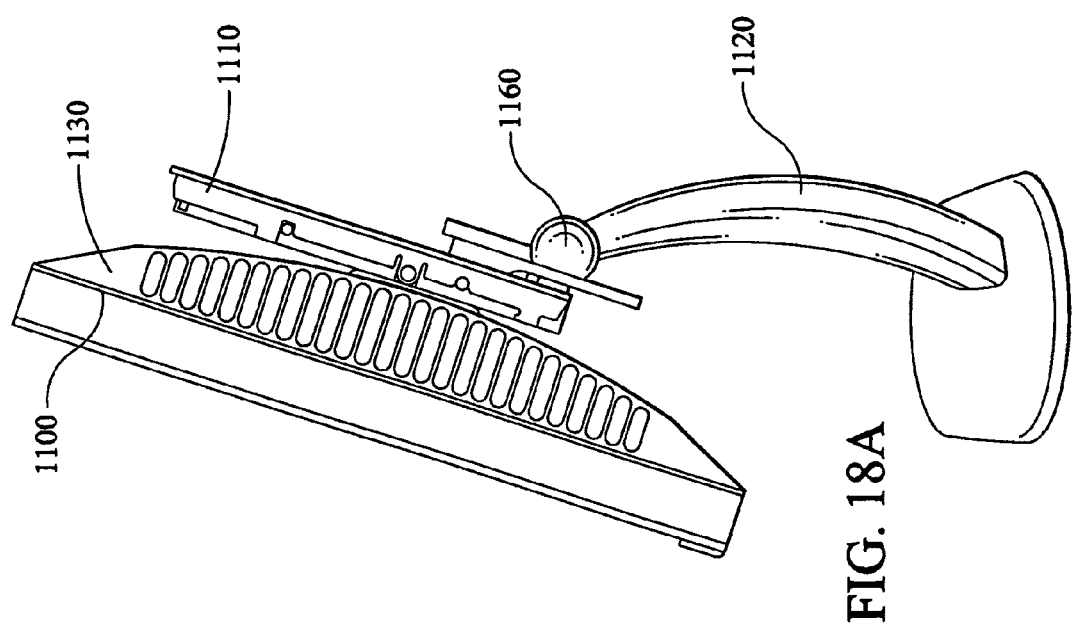
Figure 19B:
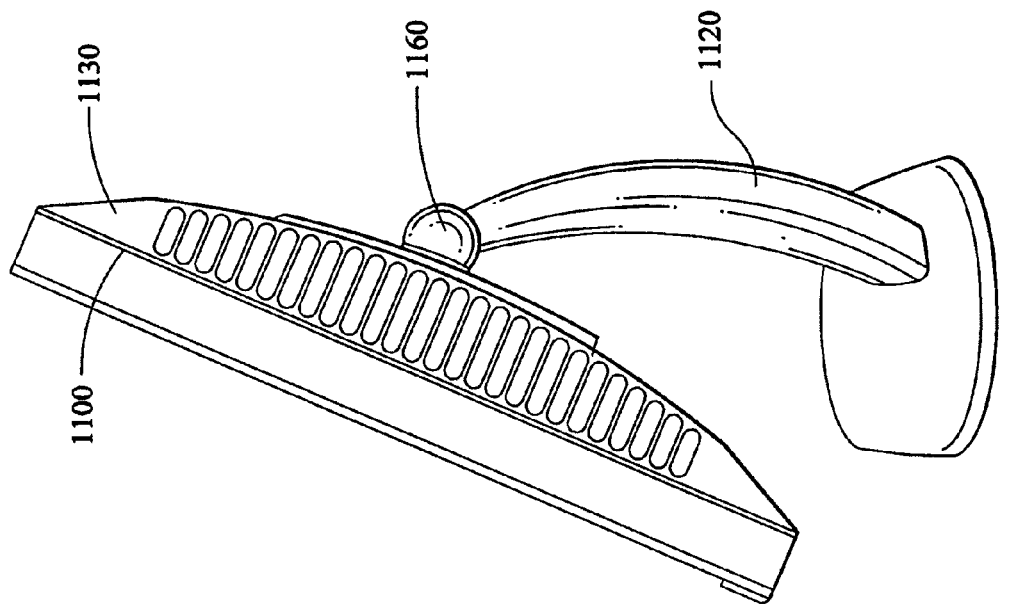
FIGS. 19A and B are side plan views of a display and stand in accordance with an exemplary embodiment of the present invention.
Figure 19A:
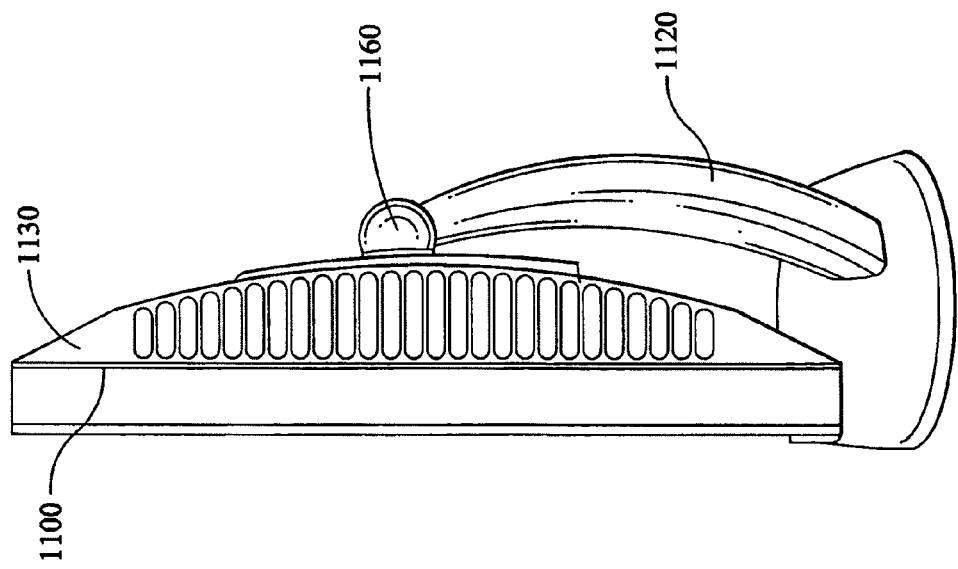

Embodiments including the balance mechanism carried on or within the display allow for a greater variety of support 1120 configurations. For example, the support 1120 may be slimmer and have a greater variety of geometric shapes (e.g., curved) than supports that house the lift device. As shown in FIG. 15, the stand 1120 may include one or more apertures 1162 to provide a relatively unobstructed view from one side of the stand to the opposite side of the stand. In addition, in some embodiments, the support 1120 contains a tilt mechanism 1160 to allow for tilting of the display as well as vertical adjustment, as best shown in FIGS. 18A & B and 19A & B.

Figure 16A:
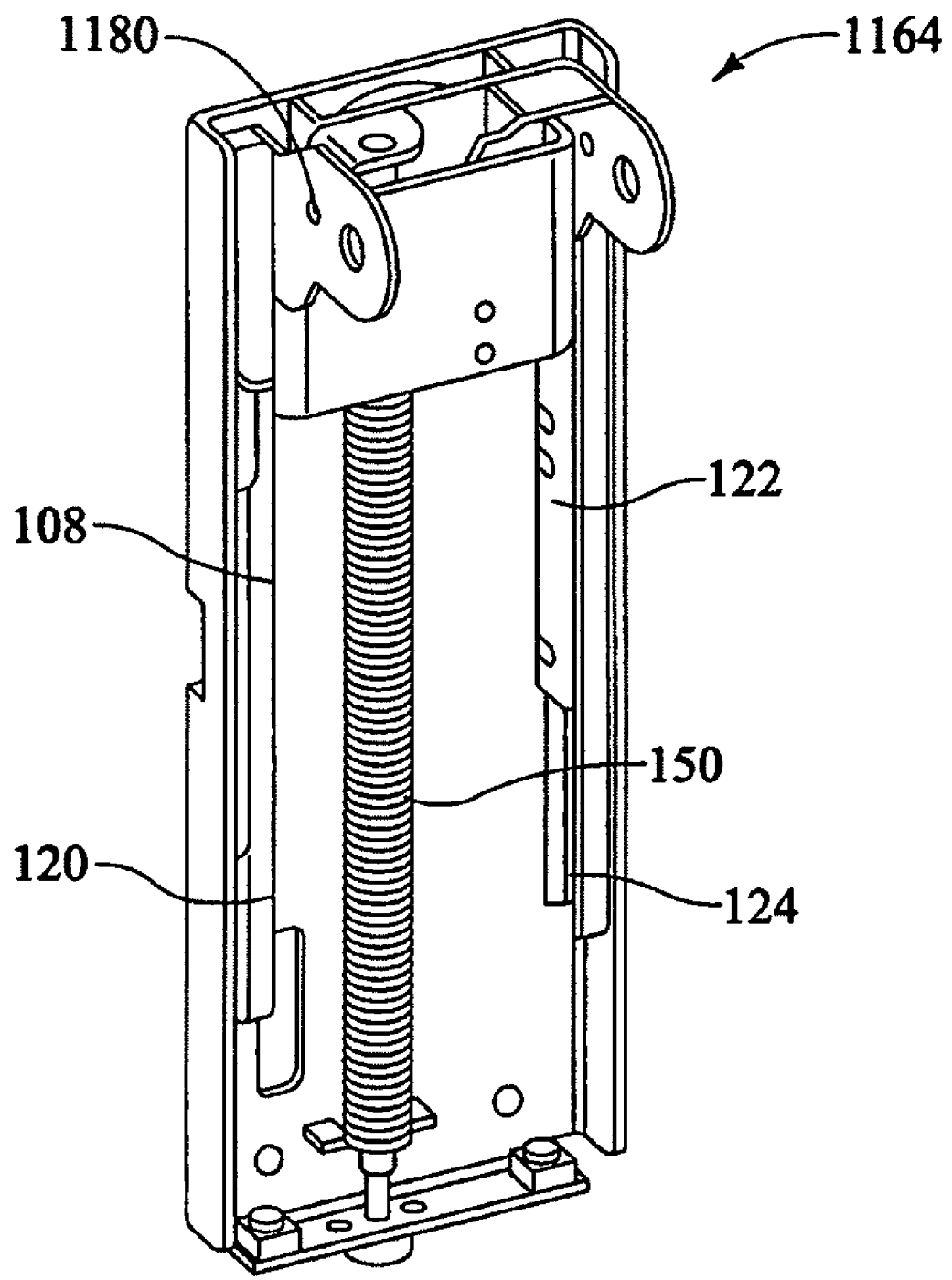
FIG. 16A is a cut away view of a lift device unit in accordance with an exemplary embodiment of the present invention.

The balance mechanism may be functionally coupled to the display and the stand in any suitable fashion. In some embodiments, the balance mechanism is incorporated into a lift device unit 1164. Such a lift device unit 1164 may comprise a convenient self contained force balancing system that may be installed in many environments to add balancing forces for easy adjustability. As shown in FIG. 16, the display may have a cavity 1150 with a shape (e.g., rectangular) adapted to receive and mate with the lift device unit 1164. In such embodiments, the lift device unit 1164 may be functionally coupled to the display by placing it within the cavity 1150. In such embodiments, the cover 1140 may include one or more slots 1170 adapted to allow a coupler 1180 carried on the lift device unit 1164 to pass through the cover 1140 and connect to the support 1120. As shown in FIG. 15, lift device unit 1164 may include one or more slots 1182 to allow for coupler 1180 to move between relatively higher and lower positions within the unit. As shown in FIG. 16A, lift device unit may include, for example, balance mechanisms such as those described with reference to FIG. 1 having a cam (not shown in FIG. 16A) and slides 108, 120, 122, and 124 and spring 150.

Figure 20:
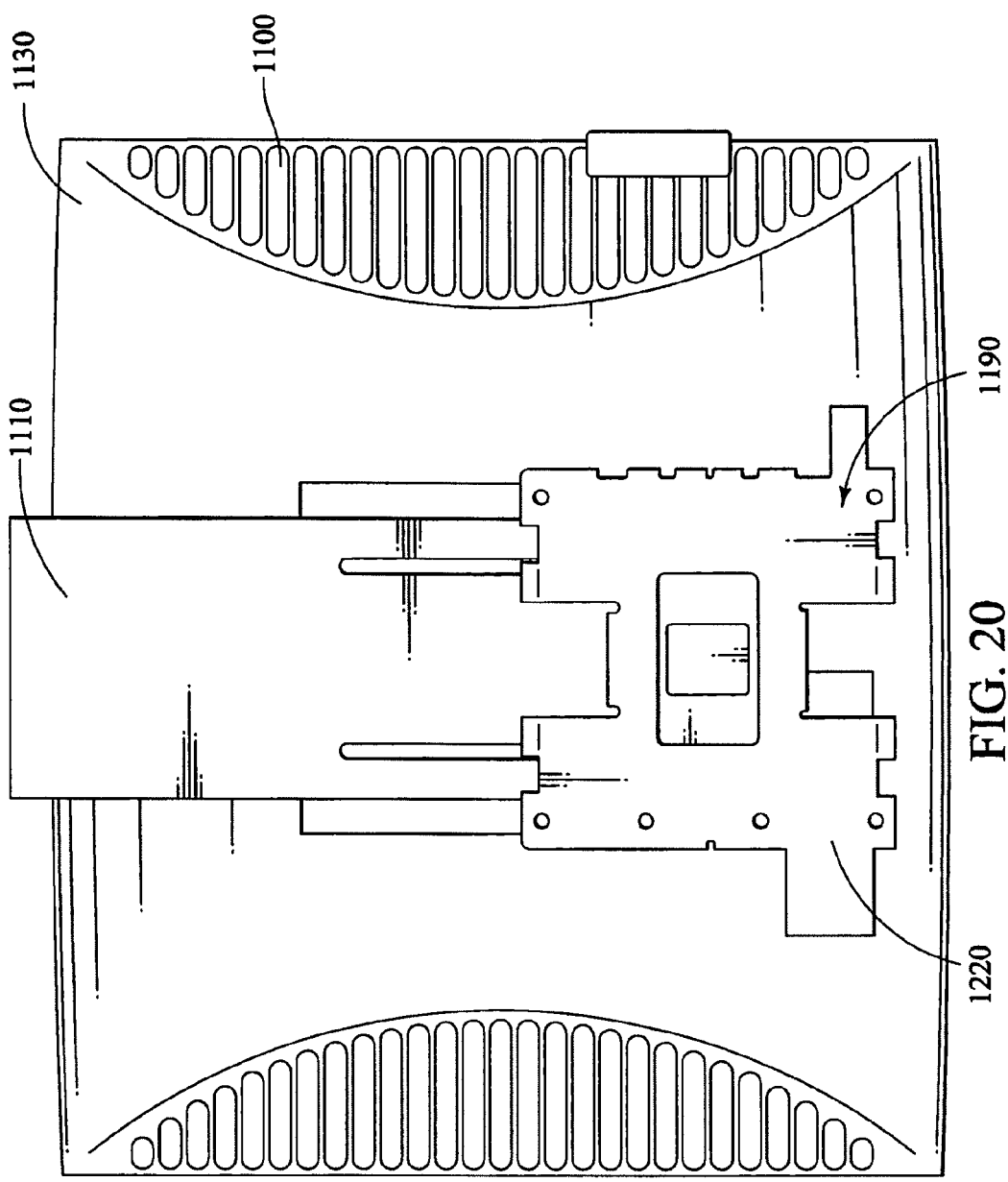
FIG. 20 is a rear plan view of a display in accordance with an exemplary embodiment of the present invention.
Figure 21B:
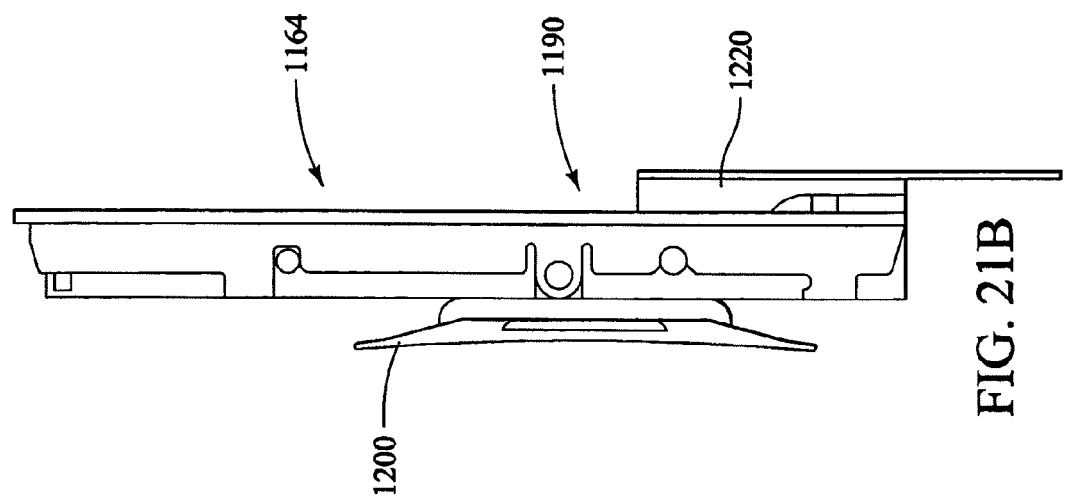
FIG. 21B is a side plan view of an assembly in accordance with an exemplary embodiment of the present invention.
Figure 21A:
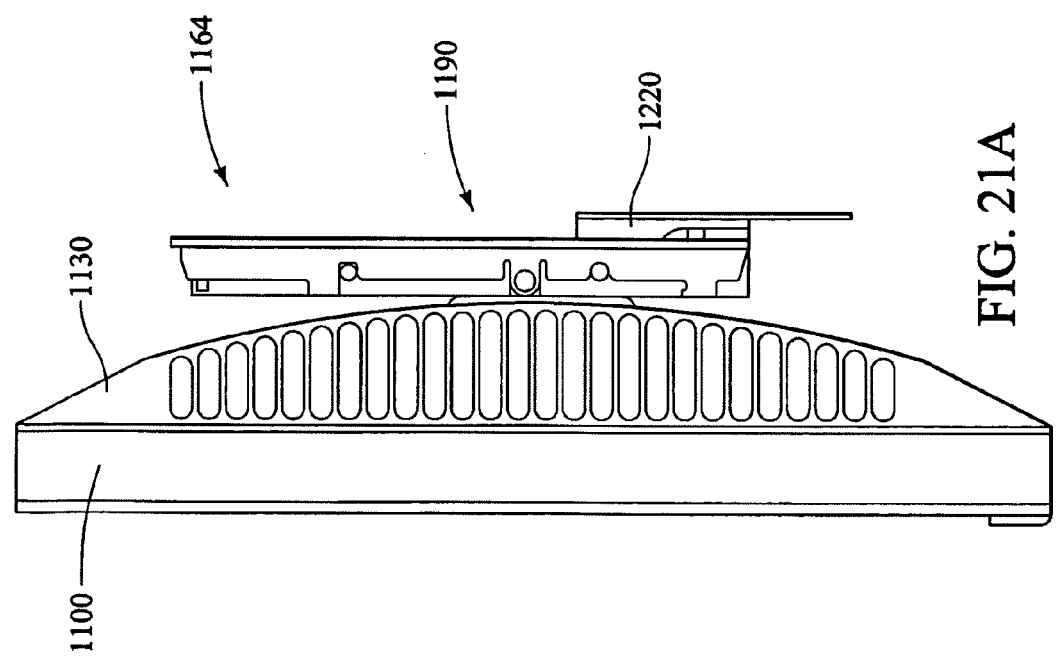
FIG. 21A is a side plan view of a display in accordance with an exemplary embodiment of the present invention.
Figure 22:
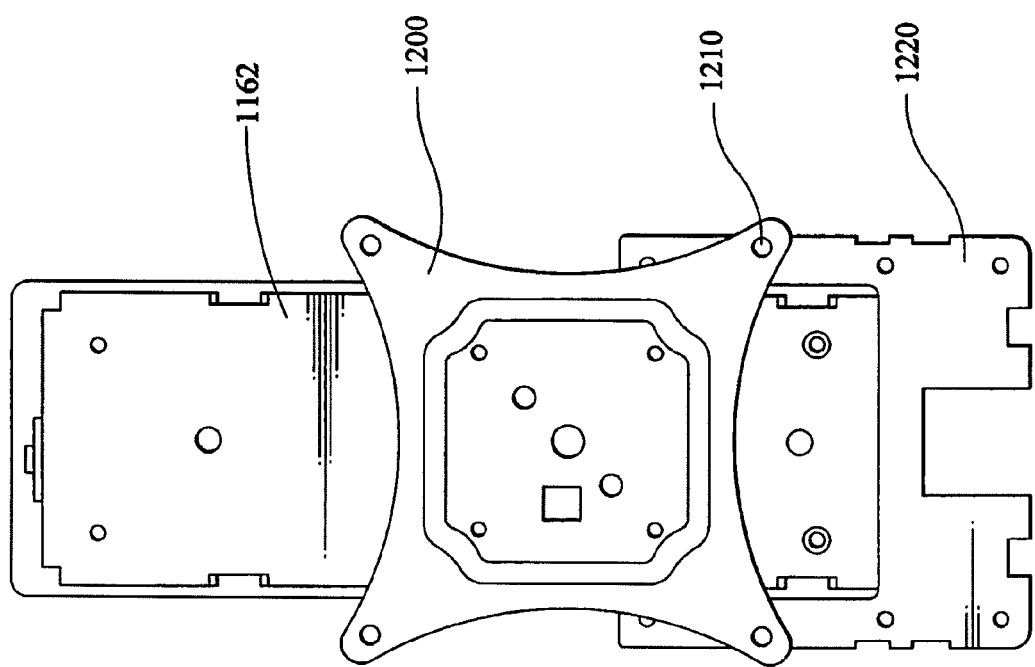
FIG. 22 is a rear plan view of an assembly in accordance with an exemplary embodiment of the present invention.

In other embodiments, the lift device 1164 may be functionally coupled to the display and the support with an assembly 1190, such as the assembly shown in FIGS. 20-22. As shown, the assembly may have a first bracket 1200 useful for functionally coupling the lift device to the display. First bracket 1200 may include one or more apertures 1210 useful for attaching the first bracket 1200 to the display housing with, for example, bolts. The assembly 1190 may also include a second bracket 1220 useful for attaching the lift device to a support (e.g., a stand). Such embodiments allow for efficient attachment of the lift device to the display and support, and facilitates utilizing the lift device with a wide variety of display sizes and shapes.

Figure 23:
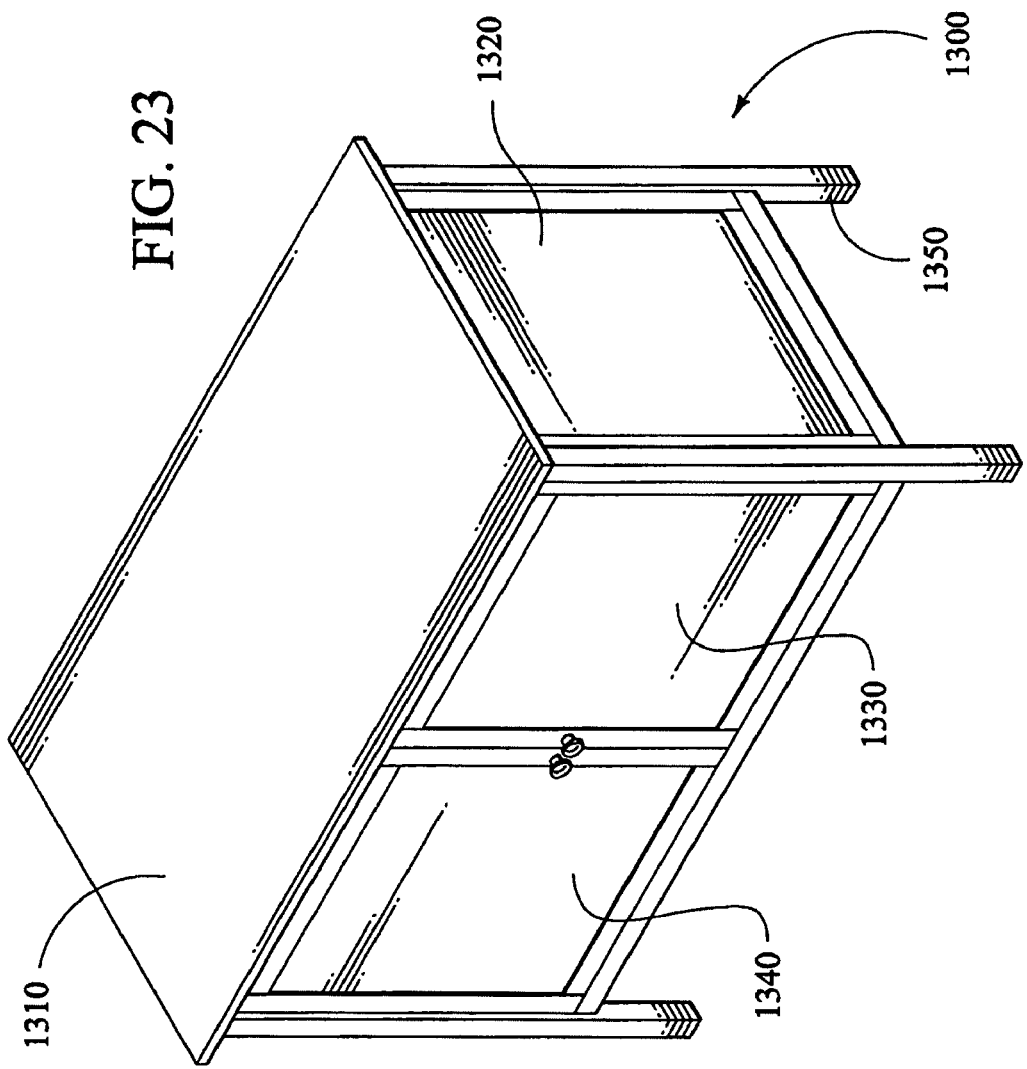
FIG. 23 is a perspective view of an article with a generally planar support surface in accordance with an additional exemplary embodiment of the present invention.

Any of the various embodiments of the balance mechanisms discussed above may also be utilized in an article with a generally planar support surface 1300, (e.g., furniture applications such as a cabinet, table, or desk). An embodiment of an article with a generally planar support surface is shown in FIGS. 23-26A. As shown in FIG. 23, the article 1300 includes a top generally planar support surface 1310. Some embodiments include at least one side surface 1320 and a front surface 1330. Front surface 1330 may be provided with one or more doors 1340 to provide access to the interior of the article 1300. One or more legs 1350 may also be provided to support the article 1300. Other examples of suitable articles include conference tables with generally planar support surface 1310 and one or more legs 1350.

Figure 24:
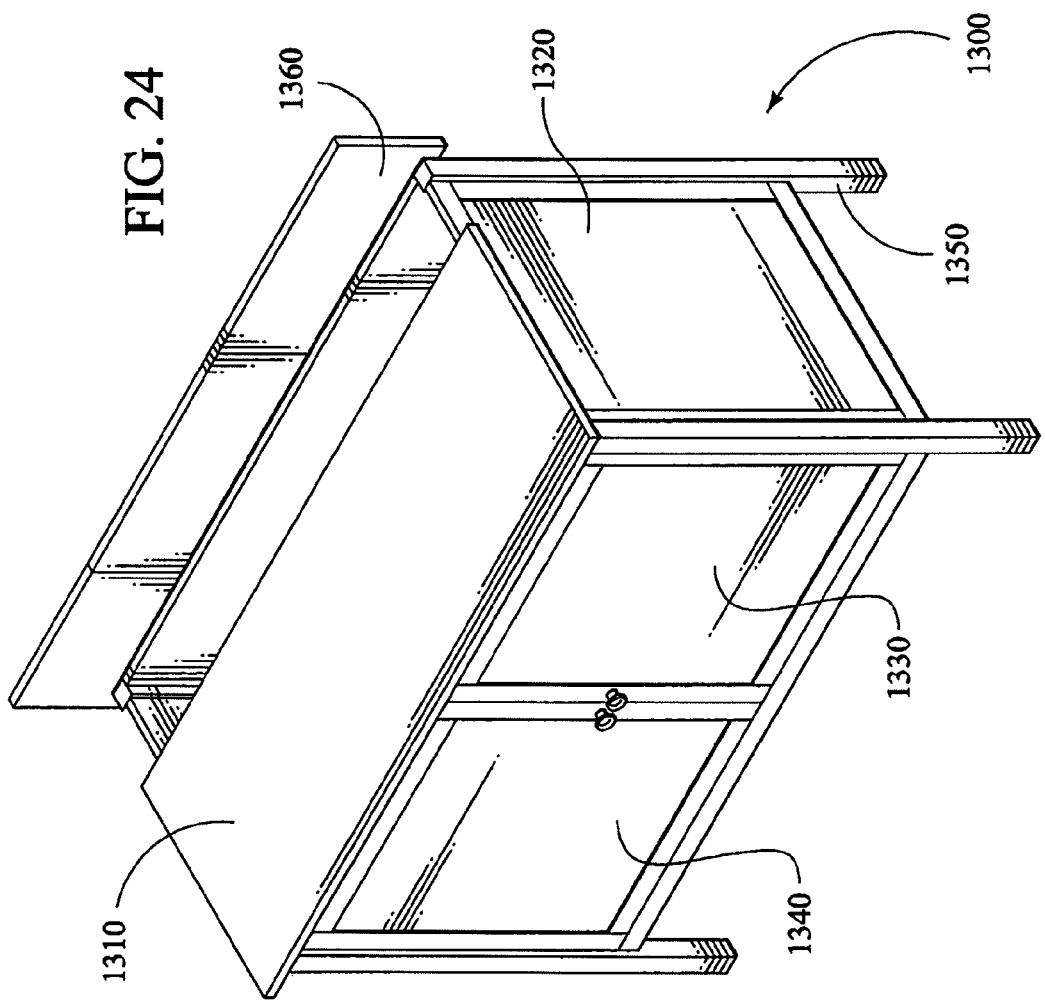
FIG. 24 is a perspective view of an article with a generally planar support surface in accordance with an exemplary embodiment of the present invention.

In some embodiments, the generally planar support surface may have a first side 1352 and a second side 1354, as shown in FIG. 26A. Second side 1354 may be useful for providing a working surface. As shown in FIG. 24, top surface 1310 may also be provided with a closable portion 1360 to allow communication between the exterior and interior of the article. Closable portion 1360 may be, for example, hingedly connected to the article 1300. The closable portion 1360 may be opened and closed manually. In some embodiments, the closable portion 1360 may be opened and/or closed via remote control (e.g., cabinet 1300 is provided with a signal receiver and motor to raise and lower closable portion 1360).

When the closable portion 1360 is open, a display 1370 may be retracted from a storage position proximate the first side of 1352 to an exposed position proximate the second side 1354. In embodiments where the generally planar support surface is horizontal, the display may be positionable between a storage position under the horizontal generally planar support surface and an exposed position above the generally planar support surface. Such an article is useful for providing a clean working surface while keeping the display hidden and protected when it is not desired to be used, and for allowing the display to be viewed when so desired.

In some embodiments, the closable portion 1360, when closed, may exert a downward force on a display to balance an upward bias on the display. In such embodiments, when the closable portion 1360 is opened and the downward force is removed, the upward bias may raise the display without user intervention. In other embodiments, opening the closable portion 1360 may trigger a release which allows the display to raise. In such embodiments, the article 1300 may be designed such that the display rises to a desired position upon the opening of the closable portion. In such embodiments, a user may exert a downward force sufficient to overcome the upward bias on the display, thereby lowering the display back to a position allowing the closable portion 1360 to be closed. In some embodiments, the closable portion 1360 may be connected to the display and not to the article 1300. In such embodiments, the closable portion 1360 may lie in perpendicular relation to the direction the display travels during raising and lowering. In such embodiments, the closable portion 1360 may be made of the same material as the article 1300, thereby providing the utility of a continuous generally planar support surface when the closable portion 1360 is in the closed position.

Figure 25:
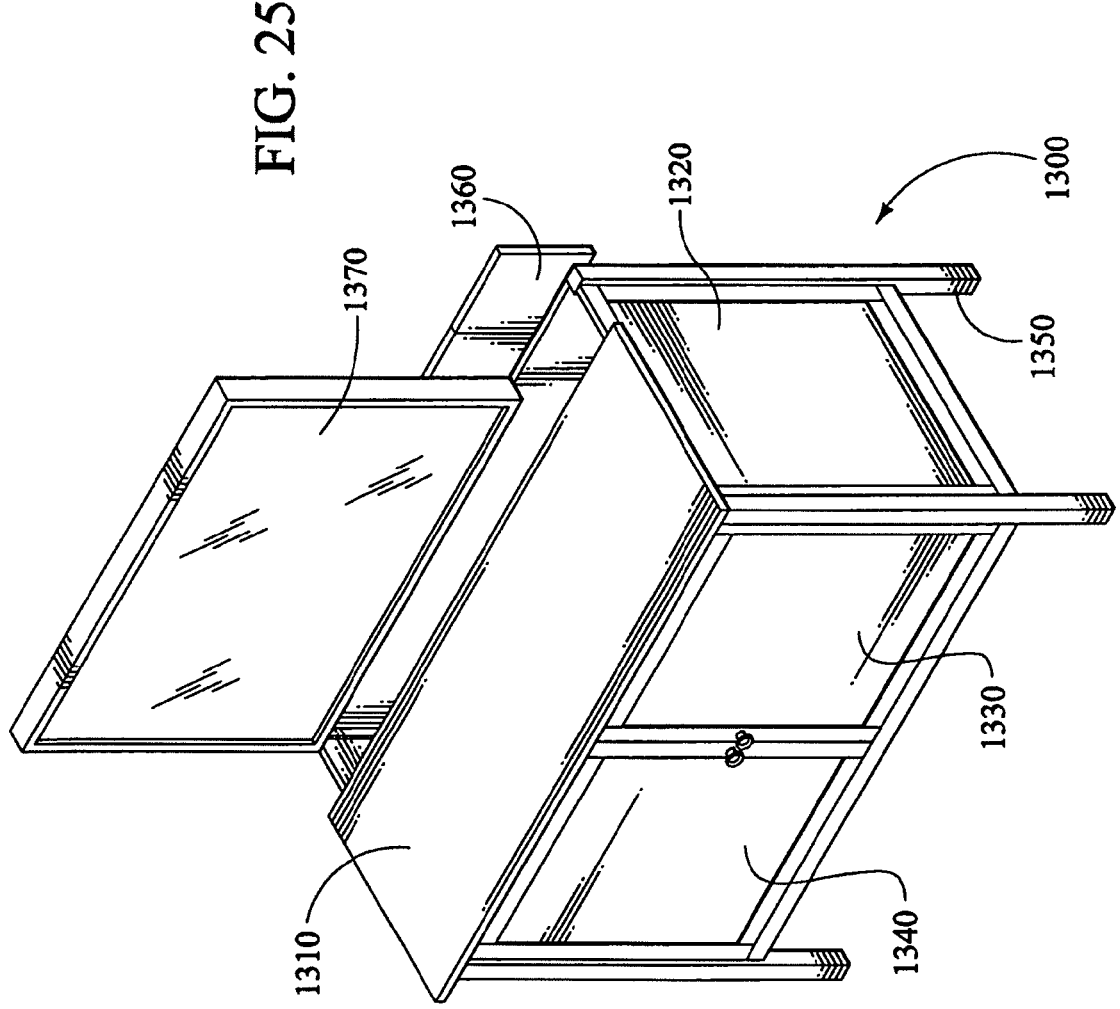
FIG. 25 is a perspective view of an article with a generally planar support surface in accordance with an exemplary embodiment of the present invention.

FIGS. 25 and 26A show a display 1370 that may be received through the closable portion 1360 when it is in an open position. Display 1370 may be a relatively large display, such as a display with a diagonal size of more than about 36 inches and weighing more than about 100 pounds. The display may be raised and/or lowered manually. In some embodiments, the vertical adjustment of the display 1370 may be actuated via remote control. In some embodiments, article 1300 is provided with a signal receiver and an actuator to release display 1370. Display 1370 may be biased to move upwards or downwards upon release, or a motor may be utilized to provide the movement. In such embodiments, the display 1370 may push the closable portion 1360 open, thereby allowing the display 1370 to rise without interference from the closable portion 1360. In such embodiments, lowering the display may urge the closable portion 1360 into the closed position or may allow the closable portion 1360 to return to the closed position.

Any of the various embodiments of lift devices discussed above may be functionally coupled to the display. Such embodiments are useful for providing an article that keeps the display out of sight until a user wishes to view it. When desired, closable portion 1360 may be opened and the display lifted and exposed. When viewing is completed, the display may be retracted beneath the generally planar support surface and the closable portion closed. Articles such as those shown in FIGS. 23-26A may save space and protect the display from gathering dust or from being damaged when not in use.

Figures 26B, 26C:
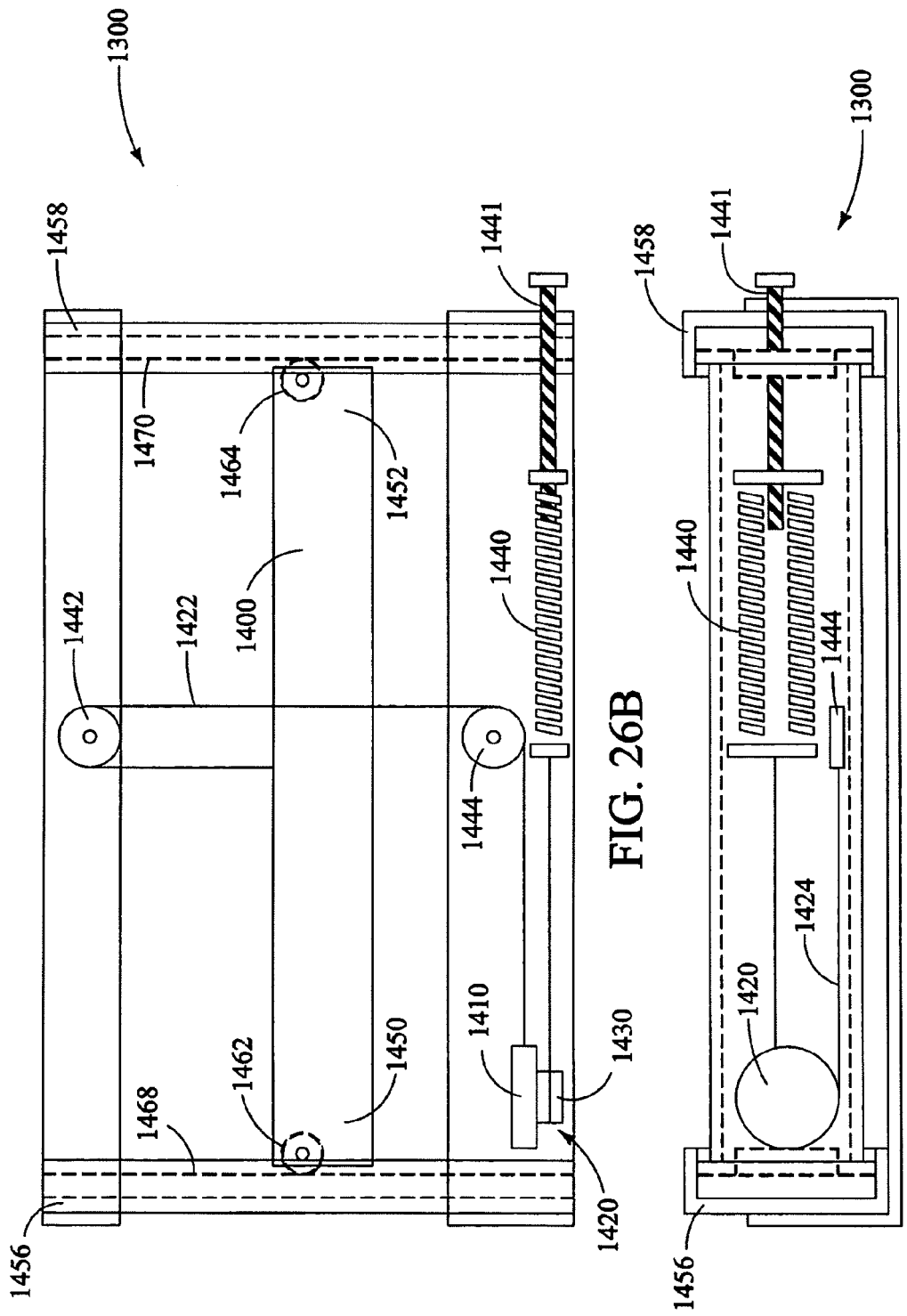
FIG. 26B is a schematic side view of an article with a generally planar support surface in accordance with an exemplary embodiment of the present invention.
FIG. 26C is a schematic bottom view of an article with a generally planar support surface in accordance with an exemplary embodiment of the present invention.

FIGS. 26B and C show schematic side and bottom views, respectively, of an article 1300 in accordance with some embodiments of the invention. As shown, article 1300 may contain a support member 1400. Support member 1400 is useful for supporting a display (not shown in FIGS. 26B and C). For example, a display may be coupled to support member 1400 by one or more brackets. In other embodiments, a display may rest on the top side of the support member 1400.

Support member 1400 may be connected to the pulley member 1410 of a wheel 1420 by second cable 1422. As discussed above, the pulley member of a wheel may be connected to a cam surface 1430, and a first cable 1424 may connect cam surface 1430 to one or more energy storage members 1440, such as springs. In some embodiments the energy storage members 1440 are functionally coupled to a tension adjustment member 1441. It should be noted that FIGS. 26B and C show only one configuration of the balancing system, and components of the balancing system, such as the cam and spring, may be placed in any suitable location. In some embodiments, additional pulleys 1442, 1444 may be useful for routing cables between the support member 1400 and wheel 1420 and/or between the wheel 1420 and energy storage members 1440.

Further, support member 1400 may be further supported on one or more of its ends 1450, 1452 by risers 1456, 1458. In addition, one or more pinions 1462, 1464 may be carried proximate the first end and/or second ends 1450, 1452 to engage with tracks 1468, 1470 located on one or more of the risers. Such embodiments are useful for providing controlled vertical adjustment of a display supported by support member 1400. As shown, articles comprising a generally planar support surface may allow for the selective exposure of a display and vertical adjustment thereof.

Figure 27:
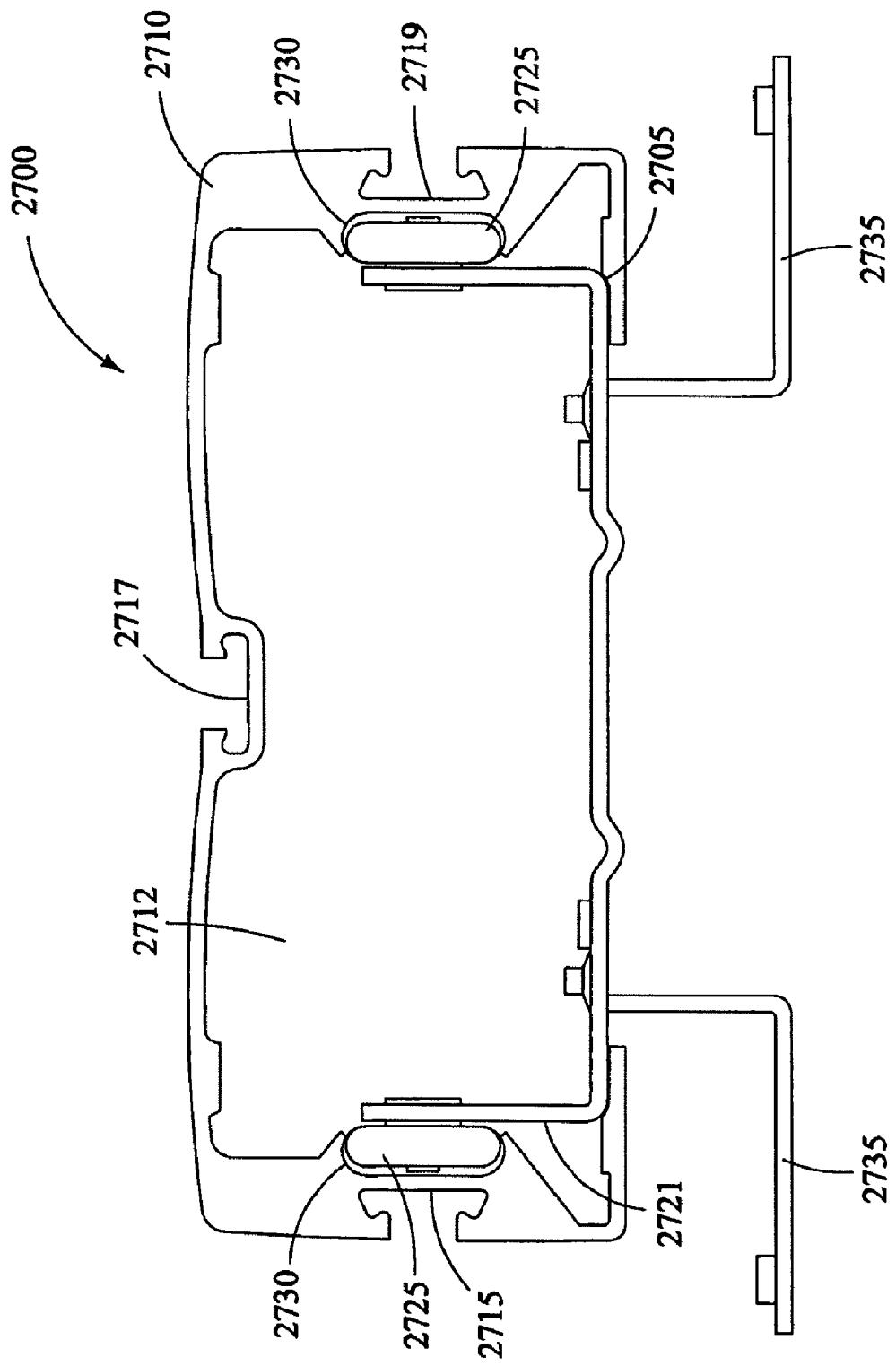
FIG. 27 is a top view of slide assembly in accordance with an exemplary embodiment of the present invention.
Figure 28:
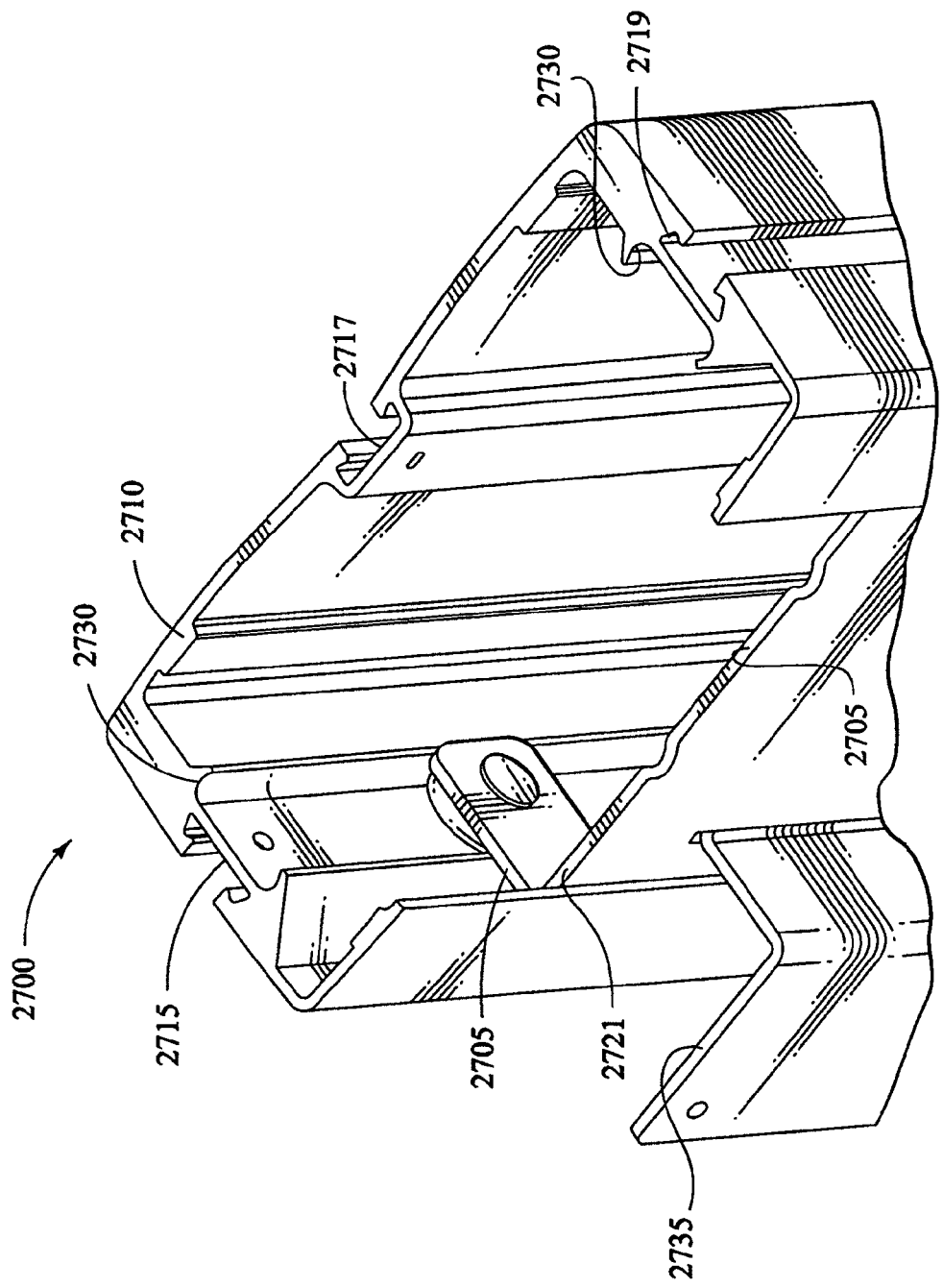
FIG. 28 is a perspective view of the slide assembly of FIG. 27.

FIGS. 27 and 28 show a slide assembly 2700 that may be used in some embodiments of the invention. Such a slide assembly may be utilized as an alternative to the first slide 102 and second slide 104 discussed in reference to FIG. 1 et al. In some embodiments, such a slide assembly 2700 may be used to support relatively larger loads, such as displays weighing more than about 100 pounds. The slide assembly may include an inner slide mechanism 2705 and an outer slide mechanism 2710 in sliding or rolling engagement, together defining a cavity 2712. It should be noted that the terms "outer slide" and "inner slide" are merely for convenience for purposes of discussion, and do not mean that the outer slide has to literally be outer of the inner slide. The outer slide mechanism 2710 may be generally enclosed on three sides and may have an opening on the top and/or bottom and on one of the sides to receive the inner slide mechanism 2705. In some embodiments, balancing mechanism components, such as wheels, cams, cables, and energy storage members, may be disposed within the cavity 2712.

The outer slide mechanism 2710 may be produced by any suitable method. In some embodiments, the outer slide mechanism 2710 may be extruded out of materials such as, e.g., aluminum. Such extruded aluminum slide mechanisms may provide a lower cost alternative to folded sheet metal, while providing higher reliability over a longer life.

In some embodiments, the outer slide mechanism 2710 may be designed with various slots (e.g., T-slots) 2715, 2717, 2719. Such slots may be useful for receiving the head of a bolt (not shown). A nut may then be tightened over the bolt to rigidly retain the bolt within the slot. Accessories, such as shelves, may then be supported by the bolts. Such a configuration allows for the location of the accessories to be easily adjusted along the length of the slots within outer slide mechanism 2710. Extrusion forming the outer slide mechanism 2710 allows for a fast and low cost method of forming these slots.

The inner slide mechanism 2705 may be received within one or more openings of the outer slide mechanism and may translate relative to the outer slide mechanism along a longitudinal axis of both the inner slide mechanism 2705 and the outer slide mechanism 2710. The inner slide mechanism 2705 may include a U-bracket 2721. The inner slide mechanism may also be operatively connected to rollers 2725, which may be coupled to the U-bracket 2721. The rollers 2725 may be configured to fit in tracks 2730 defined in the outer slide assembly 2710. The interaction of the rollers 2725 and the tracks 2730 may enable the aforementioned translation of the inner slide mechanism 2705 relative to the outer slide mechanism 2710. The rollers 2725 may comprise nylon.

The inner slide mechanism 2705 may include a mounting bracket 2735, which may be coupled to, and/or integral with, the U-bracket 2721. The mounting bracket 2721 may be configured to receive a display such as, e.g., a TV monitor. Thus, by using the exemplary slide assembly 2700 of FIGS. 27 and 28, a user may adjust the positioning of, e.g., a display.

Figure 29C:
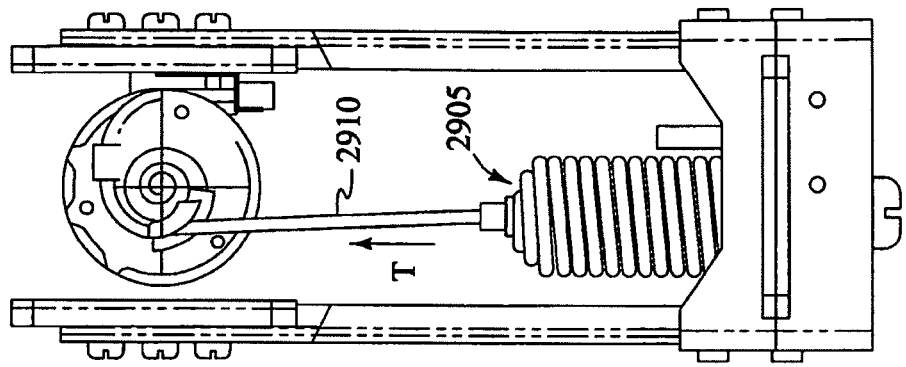
FIG. 29A-29C are cross-sectional views of a bullet type mechanism in accordance with an exemplary embodiment of the present invention.
Figure 29B:
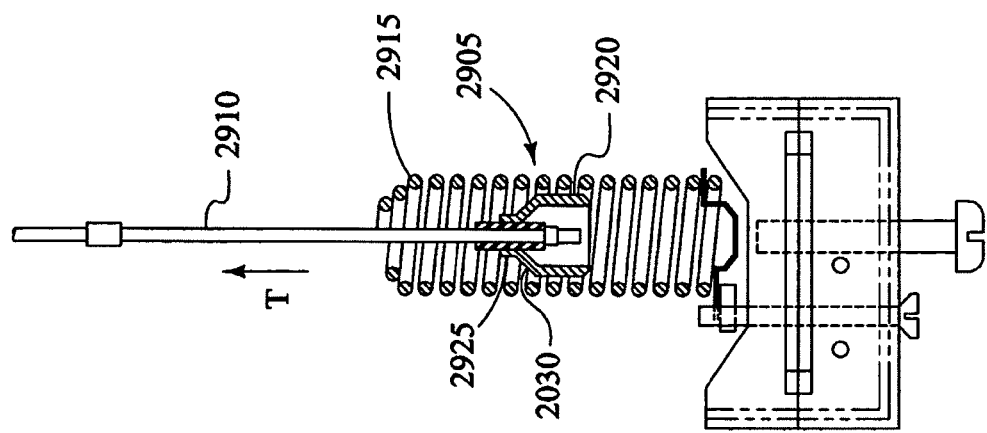
Figure 29A:
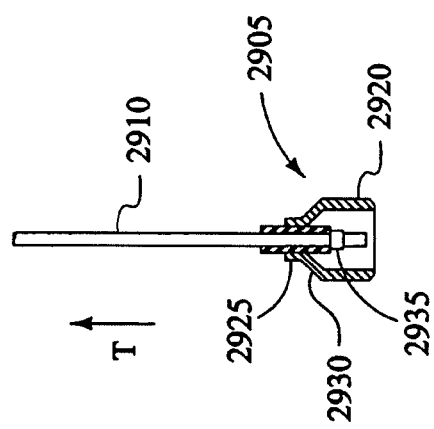

Some embodiments of the balance mechanism include a more reliable and lower cost method of coupling a cable to an energy storage member (e.g., a spring). For example, as shown in FIGS. 29A-29C, a "bullet" type mechanism 2905 that may be used to couple a cable 2910 to a coil spring 2915 in some embodiments of the invention. Such a bullet type mechanism 2905 provides a lower cost and more reliable alternative to coupling the spring to the top spring plate 153, as shown in FIG. 3. The bullet type mechanism 2905 may include three sections: a larger cylindrical section 2920, a smaller cylindrical section 2925, and an intermediate conical section 2930. The cable 2910 may be received within the smaller cylindrical section 2925 and may be prevented from withdrawing from the smaller cylindrical section 2925 by a stop 2935.

The bullet type mechanism 2905 may be configured to translate within the coil spring 2915 along a longitudinal axis of both the bullet type mechanism 2905 and the coil spring 2915. The inner diameter of the body of the coil spring 2915 may be slightly larger than the outer diameter of the larger cylindrical section 2920 of the bullet type mechanism 2905. The inner diameter of the top of the coil spring 2915 may be smaller than the outer diameter of the larger cylindrical section 2920 of the bullet type mechanism and the bullet mechanism may be configured to contact the inner surface of the spring. In such embodiments, when a tensile force T is applied to the cable 2910, the intermediate conical section 2930 of the bullet type mechanism 2905 contacts the top of the coil spring 2915, thereby applying the tensile force T to the coil spring 2915.

Embodiments using a bullet type mechanism 2905 provide several advantages over approaches that simply attach the cable directly to the top of the coil spring 2915. For example, the bullet type mechanism 2905 may contact more surface area of the coil spring 2915 than direct attachment embodiments. The increased contact area may result in a better load distribution, which may lead to fewer deformities in the coil spring 2915. Also, such embodiments may simplify the assembly process and allow for superior spring properties.

FIGS. 30A-31C show a brake 3000 that may be used in some embodiments of the present invention. Such a brake 3000 is useful for preventing a display from free falling in the event that a cable 1422 supporting the load severs or disengages. FIG. 30C shows an embodiment of a brake 3000 in its unactivated configuration, and FIG. 31C shows the same brake 3000 in its activated configuration. In some embodiments, brake 3000 is coupled to an inner slide 2705 that is in sliding or rolling engagement with an outer slide 2710. As described above, inner slide 2705 may comprise a bracket 2735 useful for mounting a display.

As shown in the Figures, brake 3000 may comprise first and second pivoting members 3010, 3012 pivotable about a coupling member 3020. In some embodiments, an actuating member 3022 may be provided to actuate the pivoting of the pivoting members 3010, 3012. Coupling member 3020 and actuating member 3022 may be carried upon a shaft 3024, such as a bolt. An energy storage member, such as spring 3030, may also be carried about shaft 3024 to provide energy to pivot the pivoting members 3010, 3012.

A cable 1422 utilized in balancing mechanism 106 may be coupled to the shaft by, for example, engaging eye 3036. Thus, in normal use, the cable extends spring 3030, moving actuating member 3022 away from pivoting members 3010, 3012 and allowing the pivoting members to assume a relaxed state, as shown in FIG. 30C. However, in the event cable tension is lost (e.g., the cable severs or disconnects), spring 3030 will push against pivot members 3010, 3012, causing them to pivot about coupling member 3020 to engage slide 2710, as shown in FIG. 31C. Once engaged, the brake 3000 will arrest downward movement of a display coupled to mounting bracket 2735. Such a brake is particularly useful in embodiments containing a large display (e.g., more than about 100 pounds), where a display in free fall could cause significant damage or injury.

In some embodiments, the pivot members 3010, 3012 may be adapted to increase the engagement (e.g., frictional engagement) with slide 2710. For example, the ends of pivot members 3010, 3012 may comprise teeth 3036 to facilitate engagement with a slide. In some embodiments, the pivot members 3010, 3012 may comprise hardened steel, which is useful for frictionally engaging a slide, particularly when the slide comprises a relatively softer and/or deformable material, such as aluminum.

It should be noted that spring 3030 need not be a high force spring, as it only needs enough energy to push the pivoting members outwards to make sure they engage with slide 2710 (e.g., about 5 pounds). That is, the spring need not provide forces sufficient to arrest a free fall of a display, as the weight of the display itself coupled with the angles of the pivoting members will tend to push the pivot members 3010, 3012 into slide 2710.

To further provide high reliability over a long life at a relatively low cost, any of the cables discussed above may be produced from materials including high tensile strength polymers. Such tensile polymers provide greater reliability over a longer useful life than wound metal cables. For example, a typical computer stand mechanism built with a steel cable will break in less than 500 cycles, while an engineered polymer fiber rope may exceed 10,000 cycles. Polymeric fibers may comprise, for example, aromatic polyester liquid crystal polymers, amid fibers, or other high tensile strength synthetic fibers woven into a rope configuration.

In addition, any of the various cams discussed above may be produced from a material comprising nylon, cast aluminum, and/or or glass filled polymers. Examples include, but are not limited to RTP 805 TFE5, which is an acetal material with 30% glass fill and 5% PTFE. These materials may comprise glass within a range of about 10-60%. Moreover, such materials may include nylon, acetal, and POM. These materials provide a sturdy and dependable cam that will not deform over many cycles at a relatively low cost.

Figure 32:
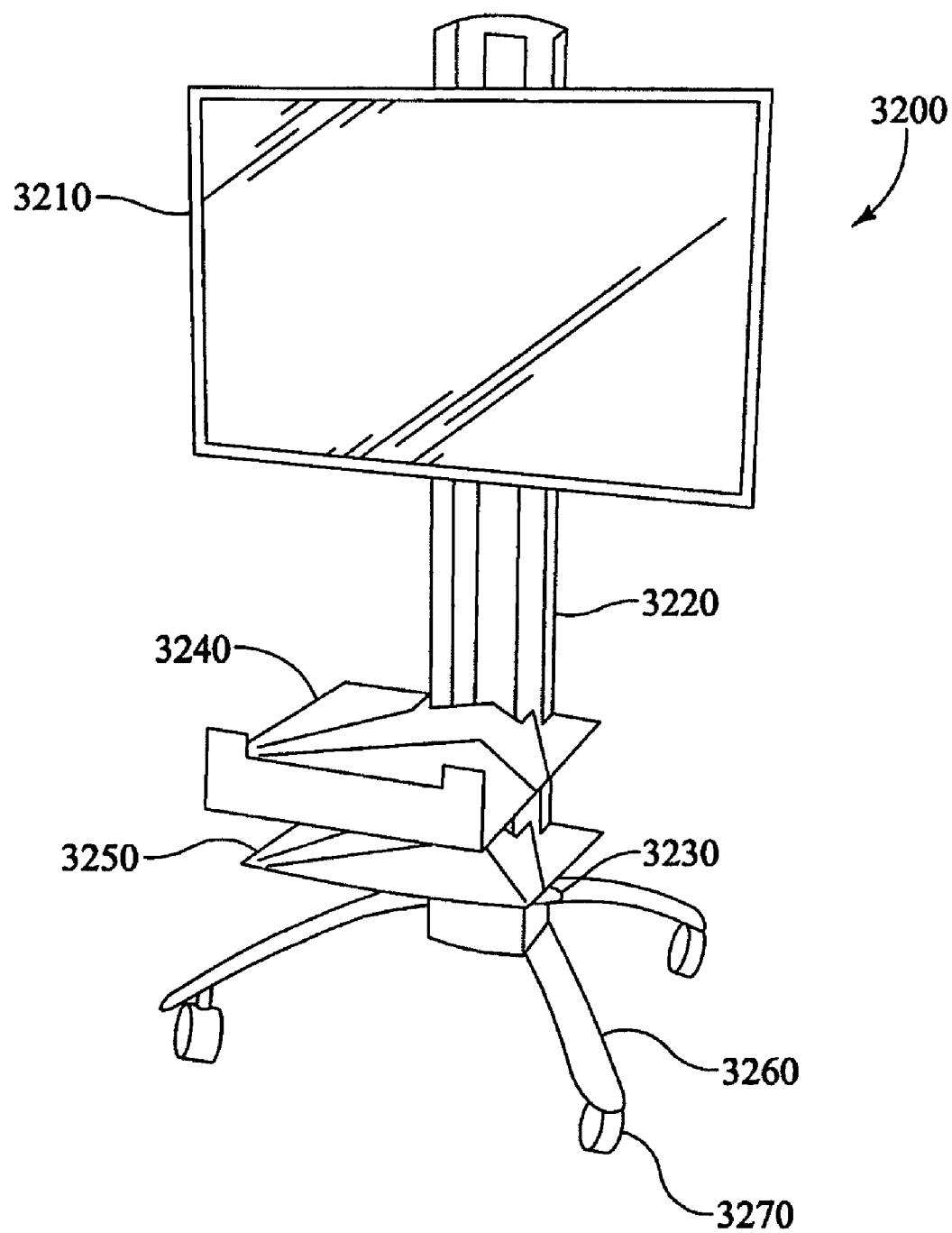
FIG. 32 is a perspective view of a cart in accordance with an embodiment of the invention.

FIG. 32 shows a cart 3200 in accordance with an embodiment of the invention. As shown, cart 3200 is useful for supporting an object, such as a display 3210. In some embodiments, the cart 3200 may be adapted to lift a display weighing over about 100 pounds (e.g., about 110 pounds). The cart 3200 is adapted to provide vertical lift to the display in the manner discussed above. In some embodiments, cart 3200 may provide about 20 inches of lift to the display.

Cart 3200 contains a column portion 3220 and a base portion 3230. Column portion 3220 is useful for providing the vertical adjustment of the display, and the base portion 3230 is useful for supporting the column portion. Column portion 3220 may contain the inner and outer slide mechanisms as shown in FIGS. 27 and 28 and described above. In some embodiments, the balance mechanism may reside entirely within the cavity 2712 as described above with reference to FIG. 27. Such embodiments are useful for protecting the balance mechanism components from contact with foreign objects without the need for additional protective coverings and also for providing a slim and easily maneuverable profile.

Further, in some embodiments, column portion 3220 may also support accessories such as first and second trays 3240, 3250. Trays 3240, 3250 may be adapted to support electronics equipment such as, for example, tuners, receivers, media players and/or recorders. In some embodiments, the trays 3240, 3250 comprise a transparent material, such as glass or clear plastic. The accessories may be coupled to the column in any suitable fashion. In some embodiments, the accessories may be coupled to a slot 2715, 2717, 2719 as described above in reference to FIGS. 27 and 28.

In some embodiments, base portion 3230 comprises one or more base arms 3260. Further, the base arms 3260 may comprise wheels 3270 to facilitate movement of the cart 3200. Such easily maneuverable carts are especially enhanced by the relatively slim column as shown in FIG. 32 and described above.

Figure 33:
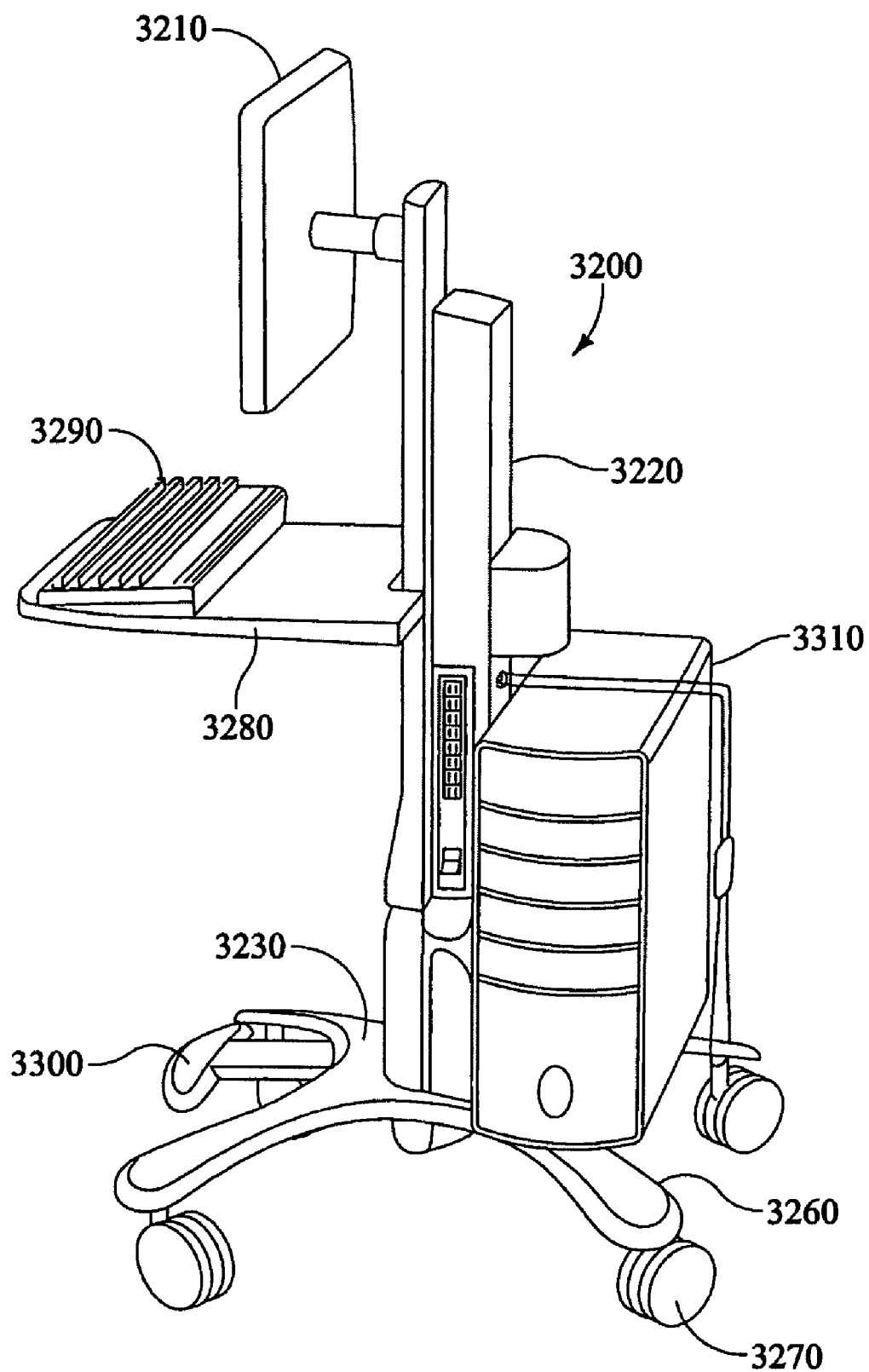
FIG. 33 is a perspective view of a cart in accordance with an embodiment of the invention.

Another embodiment of a cart 3200 is shown in FIG. 33. In the embodiment shown, cart 3200 again includes a column portion 3220 and a base portion 3230. Column portion 3220 is useful for supporting objects, such display 3210. Further, column 3220 may support accessories such as a tray 3280 useful for supporting a keyboard 3290. The column 3220 may provide for vertical adjustment of the display and tray (e.g., about 20 inches of vertical adjustment) as described above. Such carts are useful for sit-stand workstations because the vertical position of the display and keyboard may be simultaneously adjusted while keeping the relative distance between the display and keyboard constant. Any of the balancing engines disclosed above may be used to balance the forces during the vertical lift. In some embodiments, the cam is located proximate the base 3230 and has a vertical axis of rotation.

Further, a lock may be provided to lock the vertical position when desired. Such embodiments are useful for stabilizing the vertical position of the display and/or tray when the tray is used as a working surface. The lock may be actuated by any suitable method. In some embodiments, lever 3300 is used to lock and unlock the balance mechanism. For example, lever 3300 may be biased to a relatively higher position that locks the lift mechanism and may unlock the lift mechanism when depressed, such as by a foot of an operator. In some embodiments, the balance mechanism may be biased to move the display and/or tray up or down when the lift mechanism is unlocked.

In some embodiments, base portion 3230 comprises one or more base arms 3260 and wheels 3270. As shown in FIG. 33, the base 3230 may also support a CPU 3310 that is in communication (e.g., electrically and/or wirelessly) with the display 3210 and/or keyboard 3290. Of course, the cart 3310 may also be configured to support other types of equipment, such as, for example, lap top computers and scanners.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A lift mechanism, comprising:

a fixed component having proximal and distal ends;

a movable component disposed in sliding or rolling engagement with the fixed component, the engagement including a contracted configuration in which the movable component is disposed a minimum distance from the fixed component distal end and an expanded configuration in which the movable component is disposed a maximum distance from the fixed component distal end;

a wheel pivotally supported by one of the components about a pivot axis, the wheel comprising a pulley member and a cam member with an eccentric shape, the wheel having a rotational range of travel from a first angular orientation corresponding to the expanded configuration of the fixed and movable components to a second angular orientation corresponding to the contracted configuration of the fixed and movable components, wherein the rotational range of travel between the first angular orientation and the second angular orientation is less than one complete wheel rotation;

a first cable connecting the cam member of the wheel to a spring for biasing the wheel to rotate in a first direction; and a second cable connecting the pulley member to one of the components so that the wheel rotates when the movable component is moved relative to the fixed component, wherein at least the first cable does not include metal but rather comprises a tensile polymer, wherein the cam member is shaped and positioned so that the first cable contacts the cam member at a first intersection disposed a first distance from the pivot axis when the wheel is disposed in the first angular orientation and the first cable contacts the cam member at a second intersection disposed a second distance from the pivot axis when the wheel is disposed in the second angular orientation, the first distance being different than the second distance.

2. The lift mechanism of claim 1, wherein the spring has a first end with a first spring diameter and a second end with a second spring diameter, the first spring diameter being smaller than the second spring diameter, wherein the first cable is coupled to the spring by a bullet mechanism having a larger diameter than a diameter of the first cable that is configured to contact an inner surface of the spring at the first end.

3. The lift mechanism of claim 1, wherein the spring comprises an extension spring.

4. The lift mechanism of claim 1, wherein the cam member is shaped and positioned so that a torque applied to the wheel by the first cable is substantially constant while a force applied to the cam member by the first cable varies.

5. The lift mechanism of claim 1, wherein the cam member is shaped and positioned so that a torque applied to the wheel by the first cable varies.

6. The lift mechanism of claim 1, wherein the cam member is shaped so that the bias urging the wheel to rotate in the first direction is substantially constant or varied as an output of the spring changes.

7. The lift mechanism of claim 1, wherein an effective radius of the cam member varies as a function of the angular orientation of the wheel.

8. The lift mechanism of claim 1, wherein an effective radius of the cam member varies as a function of an output of the spring.

9. The lift mechanism of claim 1, wherein the apparatus includes an adjustment system adapted to vary an output of the spring.

* * * * *